(12) United States Patent
Mueller et al.

(10) Patent No.: US 7,815,716 B2
(45) Date of Patent: Oct. 19, 2010

(54) POROUS ORGANO-METALLIC SKELETON MATERIAL CONTAINING AN ADDITIONAL POLYMER

(75) Inventors: Ulrich Mueller, Neustadt (DE); Michael Hesse, Worms (DE); Markus Schubert, Ludwigshafen (DE); Melanie Urtel, Edingen-Neckarhausen (DE); Jens Assmann, Mannheim (DE); Philippe Desbois, Edingen-Neckarhausen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 276 days.

(21) Appl. No.: 12/093,656

(22) PCT Filed: Nov. 14, 2006

(86) PCT No.: PCT/EP2006/068428
§ 371 (c)(1),
(2), (4) Date: May 14, 2008

(87) PCT Pub. No.: WO2007/054581
PCT Pub. Date: May 18, 2007

(65) Prior Publication Data
US 2008/0227634 A1    Sep. 18, 2008

(30) Foreign Application Priority Data
Nov. 14, 2005    (DE) .................. 10 2005 054 523

(51) Int. Cl.
*B01J 20/26* (2006.01)
*B01D 53/02* (2006.01)
(52) U.S. Cl. .................. 95/90; 502/402; 502/439; 96/153
(58) Field of Classification Search .............. 95/90; 96/153; 502/400–402, 439
See application file for complete search history.

(56) References Cited

U.S. PATENT DOCUMENTS

| 6,491,740 B1 * | 12/2002 | Wang et al. ............... 95/90 |
| 2006/0210458 A1 | 9/2006 | Mueller et al. |
| 2007/0227898 A1 | 10/2007 | Muller et al. |

FOREIGN PATENT DOCUMENTS

| DE | 10 2005 000 938 A1 | 7/2006 |
| DE | 10 2005 022 844 A1 | 11/2006 |
| EP | 0 727 608 A2 | 8/1996 |
| EP | 1 070 538 A2 | 1/2001 |
| EP | 1 506 812 A1 | 2/2005 |
| EP | 1 702 925 A1 | 9/2006 |
| WO | WO 03/035717 A1 | 5/2003 |
| WO | WO 03/064036 | 8/2003 |
| WO | WO 2005/003069 A2 | 1/2005 |
| WO | WO 2005/049484 | 6/2005 |
| WO | WO 2005/049892 A1 | 6/2005 |
| WO | WO 2006/072573 A2 | 7/2006 |

OTHER PUBLICATIONS

Ashleigh J. Fletcher, et al., "Flexibility in metal-organic framework materials: Impact on sorption properties", Journal of Solid State Chemistry, vol. 178, XP-002428929, Aug. 1, 2005, pp. 2491-2510.
U.S. Appl. No. 12/594,604, filed Oct. 5, 2009, Stein, et al.
U.S. Appl. No. 12/597,616, filed Oct. 26, 2009, Schubert, et al.
U.S. Appl. No. 12/601,022, filed Nov. 20, 2009, Schubert, et al.
U.S. Appl. No. 12/600,539, filed Nov. 17, 2009, Schubert, et al.
U.S. Appl. No. 12/668,436, filed Jan. 11, 2010, Schubert, et al.

* cited by examiner

*Primary Examiner*—Frank M Lawrence
(74) *Attorney, Agent, or Firm*—Oblon, Spivak, McClelland, Maier & Neustadt, L.L.P.

(57) ABSTRACT

The invention relates to a porous metal-organic framework material for taking up at least one substance, the framework material comprising at least one at least bidentate organic compound bound by coordination to at least one metal ion, and the framework material having at least in part pores which comprise a polymer which is suitable to adsorb the at least one substance. In addition, the invention relates to a method for producing the framework material, a method for taking up at least one substance by the framework material and also to the use of the framework material, in particular for the storage, separation, controlled release or chemical reaction of a substance taken up.

10 Claims, 7 Drawing Sheets

POROUS ORGANO-METALLIC SKELETON MATERIAL CONTAINING AN ADDITIONAL POLYMER

CROSS REFERENCE TO RELATED APPLICATION

This application is a 371 of PCT/EP06/068428, filed on Nov. 14, 2006, and claims priority to German Patent Application No. 10 2005 054 523.8, filed on Nov. 14, 2005.

BACKGROUND OF THE INVENTION

The present invention relates to a framework material which comprises a porous metal-organic framework material and also a further polymer, methods for production thereof, use thereof and also methods for taking up at least one substance by the framework material.

Porous metal-organic framework materials are used for various purposes.

An important field of use in this case is the storage of gases. EP-B 727 608 describes, for example, the storage of methane gas using metal-organic framework materials which have a one-dimensional channel structure.

WO-A 03/064036 likewise describes the storage of gases using metal-organic framework materials. The gases to be stored in this case are hydrogen, nitrogen, noble gases, carbon monoxide, carbon dioxide and also compounds which generate and/or supply these gases.

A further important field of use is the separation of gases from gas mixtures. EP-B 1 070 538 describes the separation of carbon dioxide, water, $N_2O$, ethylene and carbon monoxide and also separating off hydrocarbons from air. Separating off xenon from a krypton/xenon mixture is described in DE-A 10 2005 000 938. Likewise, separating off odor substances from gases using metal-organic framework materials is made possible. Such a separation is subject matter of German patent application No. 10 2005 022 844.5.

Metal-organic framework materials, however, are also used in chemical synthesis. For instance, WO-A 03/035717, for example, describes the alkoxylation of organic compounds in the presence of a metal-organic framework material. The alkoxylation of monools is disclosed in WO-A 2005/003069.

To obtain novel metal-organic framework materials which have properties which lead to improved results for example in gas storage, separation or chemical synthesis, WO-A 2005/049892 proposes the production of metal-organic framework materials by an electrochemical route. In this case metal-organic framework materials are obtained which, compared with conventional framework materials, comprise the same metal ions and also ligands, but have differences in the framework which can result in improved properties. For instance, WO-A 2005/049484 describes the use of such metal-organic framework materials produced by an electrochemical route for the storage of gases, in particular saturated and unsaturated hydrocarbons, saturated and unsaturated alcohols, oxygen, nitrogen, noble gases, carbon monoxide, carbon dioxide, synthesis gas, natural gases and also hydrogen, methane, ethane, propane, butanes, ethylene, propylene, acetylene, neon, argon, krypton and also xenon.

Although by suitable choice of metal ions and ligands "tailor-made" porous metal-organic framework materials can be produced and despite alternative production methods which can introduce framework materials having improved properties, there is still a requirement for novel porous metal-organic framework materials which have improved properties compared with those described in the prior art.

BRIEF SUMMARY OF THE INVENTION

It is thus an object of the present invention to prepare framework materials which have improved properties compared with the prior art in particular in the storage and also separation of gases and in chemical synthesis.

DETAILED DESCRIPTION OF THE INVENTION

Figure 1A:
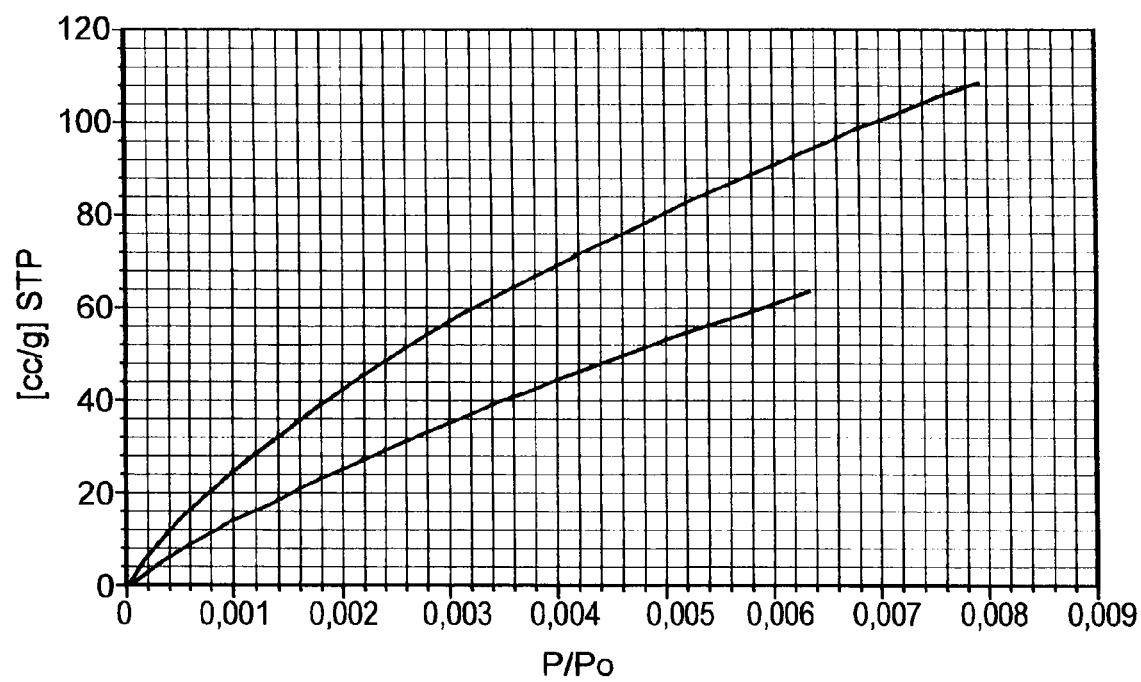
FIG. 1a shows the $H_2$ isotherms of the framework material Zn-MOF 5 (MOF 5).

The object is achieved by a porous metal-organic framework material for taking up at least one substance, the framework material comprising at least one at least bidentate organic compound bound by coordination to at least one metal ion, and the framework material having at least in part pores which comprise a polymer which is suitable to adsorb the at least one substance.

This is because it has been found that the pores of the metal-organic framework material can be occupied by a polymer which can be formed in the pores so that the take up of a substance by the metal-organic framework material, in addition via adsorption to the polymer formed in the pores of the framework material, can lead to improved separation. In addition, compared with the pure porous metal-organic framework material, improved take up of a substance in the presence of the polymer can proceed at comparatively low pressures and so have varied uses. Likewise, the take up of the substance can proceed with its take up, storage and release in the framework material at elevated temperatures. Finally, the take up of at least one substance can serve for a chemical reaction subsequently to proceed in the presence of the framework material.

The porous metal-organic framework materials are described in the prior art as such without a further polymer. The porous metal-organic framework material comprises at least one at least bidentate organic compound bound by coordination to at least one metal ion. This metal-organic framework material (MOF) is described, for example, in U.S. Pat. No. 5,648,508, EP-A-0 790 253, M. O-Keeffe et al., J. Sol. State Chem., 152 (2000), pages 3 to 20, H. Li et al., Nature 402, (1999), page 276, M. Eddaoudi et al., Topics in Catalysis 9, (1999), pages 105 to 111, B. Chen et al., Science 291, (2001), pages 1021 to 1023 and DE-A-101 11 230.

The metal-organic framework materials according to the present invention comprise pores, in particular micropores and/or mesopores. Micropores are defined as those having a diameter of 2 nm or less and mesopores are defined by a diameter in the range from 2 to 50 nm, in each case in accordance with the definition as specified by Pure & Applied Chem. 57 (1985), 603-619, in particular on page 606. The presence of micropores and/or mesopores can be studied using sorption measurements, these measurements determining the absorption capacity of the MOF for nitrogen at 77 Kelvin as specified in DIN 66131 and/or DIN 66134.

Preferably, the specific surface area, calculated according to the Langmuir model as specified in DIN 66135 (DIN 66131, 66134) for an MOF in powder form, is greater than 5 $m^2/g$, more preferably greater than 10 $m^2/g$, more preferably greater than 50 $m^2/g$, still more preferably greater than 500 $m^2/g$, still more preferably greater than 1000 $m^2/g$, and particularly preferably greater than 1500 $m^2/g$.

MOF shaped bodies can have a lower specific surface area; preferably, however, greater than 10 $m^2/g$, more preferably greater than 50 $m^2/g$, still more preferably greater than 500 $m^2/g$.

The metal component in the framework material is preferably selected from the groups Ia, IIa, IIIa, IVa to VIIIa and Ib to VIb. Particular preference is given to Mg, Ca, Sr, Ba, Sc, Y, Ti, Zr, Hf, V, Nb, Ta, Cr, Mo, W, Mn, Re, Fe, Ro, Os, Co, Rh, Ir, Ni, Pd, Pt, Cu, Ag, Au, Zn, Cd, Hg, B, Al, Ga, In, Tl, Si, Ge, Sn, Pb, As, Sb and Bi. More preference is given to Zn, Al, Mg, Ca, Cu, Ni, Fe, Pd, Pt, Ru, Rh and Co. In particular preference is given to Zn, Al, Ni, Cu, Mg, Ca, Fe. With respect to the ions of these elements, those which may particularly be mentioned are $Mg^{2+}$, $Ca^{2+}$, $Sr^{2+}$, $Ba^{2+}$, $Sc^{3+}$, $Y^{3+}$, $Ti^{4+}$, $Zr^{4+}$, $Hf^{4+}$, $V^{4+}$, $V^{3+}$, $V^{2+}$, $Nb^{3+}$, $Ta^{3+}$, $Cr^{3+}$, $Mo^{3+}$, $W^{3+}$, $Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2+}$, $Co^{3+}$, $Co^{2+}$, $Rh^{2+}$, $Rh^+$, $Ir^{2+}$, $Ir^+$, $Ni^{2+}$, $Ni^+$, $Pd^{2+}$, $Pd^+$, $Pt^{2+}$, $Pt^+$, $Cu^{2+}$, $Cu^+$, $Ag^+$, $Au^+$, $Zn^{2+}$, $Cd^{2+}$, $Hg^{2+}$, $Al^{3+}$, $Ga^{3+}$, $In^{3+}$, $Tl^{3+}$, $Si^{4+}$, $Si^{2+}$, $Ge^{4+}$, $Ge^{2+}$, $Sn^{4+}$, $Sn^{2+}$, $Pb^{4+}$, $Pb^{2+}$, $As^{5+}$, $As^{3+}$, $As^+$, $Sb^{5+}$, $Sb^{3+}$, $Sb^+$, $Bi^{5+}$, $Bi^{3+}$ and $Bi^+$.

The term "at least bidentate organic compound" designates an organic compound which comprises at least one functional group which is able to form, to a given metal ion, at least two, preferably two, coordinate bonds, and/or to two or more, preferably two metal atoms, in each case one coordinate bond.

As functional groups via which said coordinate bonds can be formed, in particular, for example, the following functional groups may be mentioned: $-CO_2H$, $-CS_2H$, $-NO_2$, $B(OH)_2$, $-SO_3H$, $-Si(OH)_3$, $-Ge(OH)_3$, $-Sn(OH)_3$, $-Si(SH)_4$, $-Ge(SH)_4$, $-Sn(SH)_3$, $-PO_3H$, $AsO_3H$, $-AsO_4H$, $-P(SH)_3$, $-As(SH)_3$, $-CH(RSH)_2$, $-C(RSH)_3$, $-CH(RNH_2)_2$, $-C(RNH_2)_3$, $-CH(ROH)_2$, $-C(ROH)_3$, $-CH(RCN)_2$, $-C(RCN)_3$, where R, for example, is preferably an alkylene group having 1, 2, 3, 4 or 5 carbon atoms, for example a methylene, ethylene, n-propylene, i-propylene, n-butylene, i-butylene, tert-butylene or n-pentylene group, or an aryl group comprising 1 or 2 aromatic nuclei, for example $2C_6$ rings which, if appropriate, can be condensed and, independently of one another, can be suitably substituted by at least in each case one substituent, and/or which independently of one another, in each case, can comprise at least one heteroatom, for example N, O and/or S. According to likewise preferred embodiments, functional groups may be mentioned in which the above-mentioned radical R is not present. In this respect, inter alia, $-CH(SH)_2$, $-C(SH)_3$, $-CH(NH_2)_2$, $-C(NH_2)_3$, $-CH(OH)_2$, $-C(OH)_3$, $-CH(CN)_2$ or $-C(CN)_3$ may be mentioned.

The at least two functional groups can in principle be bound to any suitable organic compound, provided that it is ensured that the organic compound having these functional groups is capable of forming the coordinate bond and of producing the framework material.

Preferably, the organic compounds which comprise the at least two functional groups are derived from a saturated or unsaturated aliphatic compound or an aromatic compound or a compound which is both aliphatic and aromatic.

The aliphatic compound or the aliphatic part of the both aliphatic and also aromatic compound can be linear and/or branched and/or cyclic, a plurality of cycles also being possible per compound. Further preferably, the aliphatic compound or the aliphatic part of the both aliphatic and also aromatic compound comprises 1 to 15, further preferably 1 to 14, further preferably 1 to 13, further preferably 1 to 12, further preferably 1 to 11, and in particular preferably 1 to 10 carbon atoms, for example 1, 2, 3, 4, 5, 6, 7, 8, 9 or 10 carbon atoms. In particular preference is given here to inter alia methane, adamantane, acetylene, ethylene, or butadiene.

The aromatic compound or the aromatic part of the both aromatic and also aliphatic compound can have one or else a plurality of nuclei, for example two, three, four or five nuclei, the nuclei being able to be present separately from one another and/or at least two nuclei being able to be present in condensed form. Particularly preferably, the aromatic compound or the aromatic part of the both aliphatic and also aromatic compound has one, two or three nuclei, one or two nuclei being particularly preferred. Independently of one another, in addition, each nucleus of said compound can comprise at least one heteroatom, for example N, O, S, B, P, Si, Al, preferably N, O and/or S. Further preferably, the aromatic compound or the aromatic part of the both aromatic and also aliphatic compound comprises one or two $C_6$ nuclei, the two being present either separately from one another or in condensed form. In particular, as aromatic compounds, benzene, naphthalene and/or biphenyl and/or bipyridyl and/or pyridyl may be mentioned.

For example, inter alia, trans-muconic acid or fumaric acid or phenylenebisacrylic acid may be mentioned.

For example, in the context of the present invention, mention may be made of dicarboxylic acids, such as oxalic acid, succinic acid, tartaric acid, 1,4-butanedicarboxylic acid, 4-oxopyran-2,6-dicarboxylic acid, 1,6-hexanedicarboxylic acid, decanedicarboxylic acid, 1,8-heptadecanedicarboxylic acid, 1,9-heptadecanedicarboxylic acid, heptadecanedicarboxylic acid, acetylenedicarboxylic acid, 1,2-benzenedicarboxylic acid, 2,3-pyridinedicarboxylic acid, pyridine-2,3-dicarboxylic acid, 1,3-butadiene-1,4-dicarboxylic acid, 1,4-benzenedicarboxylic acid, p-benzenedicarboxylic acid, imidazole-2,4-dicarboxylic acid, 2-methylquinoline-3,4-dicarboxylic acid, quinoline-2,4-dicarboxylic acid, quinoxaline-2,3-dicarboxylic acid, 6-chloroquinoxaline-2,3-dicarboxylic acid, 4,4'-diaminophenylmethane-3,3'-dicarboxylic acid, quinoline-3,4-dicarboxylic acid, 7-chloro-4-hydroxyquinoline-2,8-dicarboxylic acid, diimidodicarboxylic acid, pyridine-2,6-dicarboxylic acid, 2-methylimidazole-4,5-dicarboxylic acid, thiophene-3,4-dicarboxylic acid, 2-isopropylimidazole-4,5-dicarboxylic acid, tetrahydropyran-4,4-dicarboxylic acid, perylene-3,9-dicarboxylic acid, perylenedicarboxylic acid, Pluriol E 200 dicarboxylic acid, 3,6-dioxaoctanedicarboxylic acid, 3,5-cyclohexadiene-1,2-dicarboxylic acid, octadicarboxylic acid, pentane-3,3-carboxylic acid, 4,4'-diamino-1,1'-biphenyl-3,3'-dicarboxylic acid, 4,4'-diaminobiphenyl-3,3'-dicarboxylic acid, benzidine-3,3'-dicarboxylic acid, 1,4-bis(phenylamino)benzene-2,5-dicarboxylic acid, 1,1'-binaphthyl-dicarboxylic acid, 7-chloro-8-methylquinoline-2,3-dicarboxylic acid, 1-anilinoanthraquinone-2,4'- dicarboxylic acid, polytetrahydrofuran-250-dicarboxylic acid, 1,4-bis(carboxy-methyl)piperazine-2,3-dicarboxylic acid, 7-chloroquinoline-3,8-dicarboxylic acid, 1-(4-carboxy) phenyl-3-(4-chloro)phenylpyrazoline-4,5-dicarboxylic acid, 1,4,5,6,7,7-hexa-chloro-5-norbornene-2,3-dicarboxylic acid, phenylindanedicarboxylic acid, 1,3-dibenzyl-2-ox-oimidazolidine-4,5-dicarboxylic acid, 1,4-cyclohexanedicarboxylic acid, naphthalene-1,8-dicarboxylic acid, 2-benzoyl-benzene-1,3-dicarboxylic acid, 1,3-dibenzyl-2-oxoimidazolidine-4,5-cis-dicarboxylic acid, 2,2'-biquinoline-4,4'-dicarboxylic acid, pyridine-3,4-dicarboxylic acid, 3,6,9-trioxaundecanedicarboxylic acid, hydroxybenzophenonedicarboxylic acid, Pluriol E 300-dicarboxylic acid, Pluriol E 400-dicarboxylic acid, Pluriol E 600-dicarboxylic acid, pyrazole-3,4-dicarboxylic acid, 2,3-pyrazinedicarboxylic acid, 5,6-dimethyl-2,3-pyrazinedicarboxylic acid, 4,4'-diaminodiphenyletherdiimidodicarboxylic acid, 4,4'-diaminodiphenylmethanediimidodicarboxylic acid, 4,4'-diaminodiphenyl-sulfonediimidodicarboxylic acid, 2,6-naphthalenedicarboxylic acid, 1,3-adamantanedicarboxylic acid, 1,8-naphthalenedicarboxylic acid, 2,3-naphthalenedicarboxylic acid, 8-methoxy-2,3-naphthalenedicarboxylic acid, 8-nitro-2,3-naphthalenecarboxylic acid, 8-sulfo-2,3-naphthalenedicarboxylic acid, anthracene-2,3-dicarboxylic acid, 2',3'-diphenyl-p-terphenyl-4,4'''-dicarboxylic acid, diphenylether-4,4'-dicarboxylic acid, imidazole-4,5-dicarboxylic acid, 4(1H)-oxothiochromene-2,8-dicarboxylic acid, 5-tert-butyl-1,3-benzenedicarboxylic acid, 7,8-quinolinedicarboxylic acid, 4,5-imidazoledicarboxylic acid, 4-cyclohexene-1,2-dicarboxylic acid, hexatriacontanedicarboxylic acid, tetradecanedicarboxylic acid, 1,7-heptadicarboxylic acid, 5-hydroxy-1,3-benzene-dicarboxylic acid, pyrazine-2,3-dicarboxylic acid, furan-2,5-dicarboxylic acid, 1-nonene-6,9-dicarboxylic acid, eicosenedicarboxylic acid, 4,4'-dihydroxydiphenylmethane-3,3'-dicarboxylic acid, 1-amino-4-methyl-9,10-dioxo-9,10-dihydroanthracene-2,3-dicarboxylic acid, 2,5-pyridinedicarboxylic acid, cyclohexene-2,3-dicarboxylic acid, 2,9-dichlorofluorubin-4,11-dicarboxylic acid, 7-chloro-3-methylquinoline-6,8-dicarboxylic acid, 2,4-dichlorobenzophenone-2',5'-dicarboxylic acid, 1,3-benzenedicarboxylic acid, 2,6-pyridinedicarboxylic acid, 1-methylpyrrole-3,4-dicarboxylic acid, 1-benzyl-1H-pyrrole-3,4-dicarboxylic acid, anthraquinone-1,5-dicarboxylic acid, 3,5-pyrazoledicarboxylic acid, 2-nitrobenzene-1,4-dicarboxylic acid, heptane-1,7-dicarboxylic acid, cyclobutane-1,1-dicarboxylic acid, 1,14-tetradecanedicarboxylic acid, 5,6-dehydronorbornane-2,3-dicarboxylic acid or 5-ethyl-2,3-pyridinedicarboxylic acid, tricarboxylic acids such as 2-hydroxy-1,2,3-propanetricarboxylic acid, 7-chloro-2,3,8-quinolinetricarboxylic acid, 1,2,4-benzenetricarboxylic acid, 1,2,4-butanetricarboxylic acid, 2-phosphono-1,2,4-butanetricarboxylic acid, 1,3,5-benzenetricarboxylic acid, 1-hydroxy-1,2,3-propanetricarboxylic acid, 4,5-dihydro-4,5-dioxo-1H-pyrrolo[2,3-F]quinoline-2,7,9-tricarboxylic acid, 5-acetyl-3-amino-6-methylbenzene-1,2,4-tricarboxylic acid, 3-amino-5-benzoyl-6-methylbenzene-1,2,4-tricarboxylic acid, 1,2,3-propanetricarboxylic acid or aurintricarboxylic acid, or tetracarboxylic acids such as 1,1-dioxidoperylo[1,12-BCD]thiophene-3,4,9,10-tetracarboxylic acid, perylenetetracarboxylic acids such as perylene-3,4,9,10-tetracarboxylic acid or perylene-1,12-sulfone-3,4,9,10-tetracarboxylic acid, butanetetracarboxylic acids such as 1,2,3,4-butanetetracarboxylic acid or meso-1,2,3,4-butanetetracarboxylic acid, decane-2,4,6,8-tetracarboxylic acid, 1,4,7,10,13,16-hexaoxacyclooctadecane-2,3,11,12-tetracarboxylic acid, 1,2,4,5-benzenetetracarboxylic acid, 1,2,11,12-dodecanetetracarboxylic acid, 1,2,5,6-hexanetetracarboxylic acid, 1,2,7,8-octanetetracarboxylic acid, 1,4,5,8-naphthalenetetracarboxylic acid, 1,2,9,10-decanetetracarboxylic acid, benzophenonetetracarboxylic acid, 3,3',4,4'-benzophenonetetracarboxylic acid, tetrahydrofurantetracarboxylic acid or cyclopentanetetracarboxylic acids such as cyclopentane-1,2,3,4-tetracarboxylic acid.

Very particularly preferably, use is made of optionally at least monosubstituted mono-, di-, tri-, tetranuclear or higher nuclear aromatic di-, tri- or tetracarboxylic acids, each of the nuclei being able to comprise at least one heteroatom, two or more nuclei being able to comprise identical or different heteroatoms. For example, preference is given to mononuclear dicarboxylic acids, mononuclear tricarboxylic acids, mononuclear tetracarboxylic acids, dinuclear dicarboxylic acids, dinuclear tricarboxylic acids, dinuclear tetracarboxylic acids, trinuclear dicarboxylic acids, trinuclear tricarboxylic acids, trinuclear tetracarboxylic acids, tetranuclear dicarboxylic acids, tetranuclear tricarboxylic acids and/or tetranuclear tetracarboxylic acids. Suitable heteroatoms are, for example, N, O, S, B, P, Si, Al, preferred heteroatoms in this case are N, S and/or O. A suitable substituent which may be mentioned in this respect is, inter alia, —OH, a nitro group, an amino group or an alkyl or alkoxy group.

In particular preferably, as at least bidentate organic compounds, use is made of acetylenedicarboxylic acid (ADC), benzenedicarboxylic acids, naphthalenedicarboxylic acids, biphenyldicarboxylic acids, for example 4,4'-biphenyldicarboxylic acid (BPDC), bipyridinedicarboxylic acids, for example 2,2'-bipyridinedicarboxylic acids, for example 2,2'-bipyridine-5,5-dicarboxylic acid, benzenetricarboxylic acids, for example 1,2,3-benzenetricarboxylic acid or 1,3,5-benzenetricarboxylic acid (BTC), adamantanetetracarboxylic acid (ATC), adamantanedibenzoate (ADB), benzenetribenzoate (BTB), methanetetrabenzoate (MTB), adamantanetetrabenzoate, or dihydroxyterephthalic acids, for example 2,5-dihydroxyterephthalic acid (DHBDC).

Very particularly preferably, use is made of, inter alia, isophthalic acid, terephthalic acid, 2,5-dihydroxyterephthalic acid, 1,2,3-benzenetricarboxylic acid, 1,3,5-benzenetricarboxylic acid, or 2,2-bipyridine-5,5'-dicarboxylic acid.

In addition to these at least bidentate organic compounds, the MOF can also comprise one or more monodentate ligands.

Suitable solvents for producing the MOFs are, inter alia, ethanol, dimethylformamide, toluene, methanol, chlorobenzene, diethylformamide, dimethyl sulfoxide, water, hydrogen peroxide, methylamine, sodium hydroxide solution, N-methylpolidone ether, acetonitrile, benzyl chloride, triethylamine, ethylene glycol and mixtures thereof. Further metal ions, at least bidentate organic compounds and solvents for producing MOFs are described, inter alia, in U.S. Pat. No. 5,648,508 or DE-A 101 11 230.

The pore size of the MOF can be controlled by selection of the suitable ligand and/or of the at least bidentate organic compound. It is generally true that the greater the organic compound, the greater is the pore size. Preferably, the pore size is 0.2 nm to 30 nm, particularly preferably the pore size is in the range from 0.3 nm to 3 nm, based on the crystalline material.

In an MOF shaped body, however, larger pores also occur, the size distribution of which can vary. Preferably, however, more than 50% of the total pore volume, in particular more than 75%, is formed by pores having a pore diameter of up to 1000 nm. Preferably, however, a majority of the pore volume is formed by pores of two diameter ranges. It is therefore further preferred if more than 25% of the total pore volume, in particular more than 50% of the total pore volume, is formed by pores which are in a diameter range from 100 nm to 800 nm, and if more than 15% of the total pore volume, in particular more than 25% of the total pore volume, is formed by pores which are in a diameter range of up to 10 nm. The pore distribution can be determined by means of mercury porosimetry.

Examples of metal-organic framework materials are given hereinafter. In addition to the designation of the MOF, the metal and also the at least bidentate ligand, in addition the solvent and also the cell parameters (angle α, β and γ and also the distances A, B and C in Å) are given. The latter were determined by X-ray diffraction.

| MOF-n | Constituents molar ratio M + L | Solvents | α | β | γ | a | b | c | Space group |
|---|---|---|---|---|---|---|---|---|---|
| MOF-0 | $Zn(NO_3)_2 \cdot 6H_2O$ $H_3(BTC)$ | Ethanol | 90 | 90 | 120 | 16.711 | 16.711 | 14.189 | P6(3)/Mcm |
| MOF-2 | $Zn(NO_3)_2 \cdot 6H_2O$ (0.246 mmol) $H_2(BDC)$ 0.241 mmol | DMF Toluene | 90 | 102.8 | 90 | 6.718 | 15.49 | 12.43 | P2(1)/n |
| MOF-3 | $Zn(NO_3)_2 \cdot 6H_2O$ (1.89 mmol) $H_2(BDC)$ (1.93 mmol) | DMF MeOH | 99.72 | 111.11 | 108.4 | 9.726 | 9.911 | 10.45 | P-1 |
| MOF-4 | $Zn(NO_3)_2 \cdot 6H_2O$ (1.00 mmol) $H_3(BTC)$ (0.5 mmol) | Ethanol | 90 | 90 | 90 | 14.728 | 14.728 | 14.728 | P2(1)3 |
| MOF-5 | $Zn(NO_3)_2 \cdot 6H_2O$ (2.22 mmol) $H_2(BDC)$ (2.17 mmol) | DMF Chlorobenzene | 90 | 90 | 90 | 25.669 | 25.669 | 25.669 | Fm-3m |
| MOF-38 | $Zn(NO_3)_2 \cdot 6H_2O$ (0.27 mmol) $H_3(BTC)$ (0.15 mmol) | DMF Chlorobenzene | 90 | 90 | 90 | 20.657 | 20.657 | 17.84 | I4cm |
| MOF-31 $Zn(ADC)_2$ | $Zn(NO_3)_2 \cdot 6H_2O$ 0.4 mmol $H_2(ADC)$ 0.8 mmol | Ethanol | 90 | 90 | 90 | 10.821 | 10.821 | 10.821 | Pn(-3)m |
| MOF-12 $Zn_2(ATC)$ | $Zn(NO_3)_2 \cdot 6H_2O$ 0.3 mmol $H_4(ATC)$ 0.15 mmol | Ethanol | 90 | 90 | 90 | 15.745 | 16.907 | 18.167 | Pbca |
| MOF-20 ZnNDC | $Zn(NO_3)_2 \cdot 6H_2O$ 0.37 mmol $H_2NDC$ 0.36 mmol | DMF Chlorobenzene | 90 | 92.13 | 90 | 8.13 | 16.444 | 12.807 | P2(1)/c |
| MOF-37 | $Zn(NO_3)_2 \cdot 6H_2O$ 0.2 mmol $H_2NDC$ 0.2 mmol | DEF Chlorobenzene | 72.38 | 83.16 | 84.33 | 9.952 | 11.576 | 15.556 | P-1 |
| MOF-8 $Tb_2(ADC)$ | $Tb(NO_3)_3 \cdot 5H_2O$ 0.10 mmol $H_2ADC$ 0.20 mmol | DMSO MeOH | 90 | 115.7 | 90 | 19.83 | 9.822 | 19.183 | C2/c |
| MOF-9 $Tb_2(ADC)$ | $Tb(NO_3)_3 \cdot 5H_2O$ 0.08 mmol $H_2ADB$ 0.12 mmol | DMSO | 90 | 102.09 | 90 | 27.056 | 16.795 | 28.139 | C2/c |
| MOF-6 | $Tb(NO_3)_3 \cdot 5H_2O$ 0.30 mmol $H_2(BDC)$ 0.30 mmol | DMF MeOH | 90 | 91.28 | 90 | 17.599 | 19.996 | 10.545 | P21/c |
| MOF-7 | $Tb(NO_3)_3 \cdot 5H_2O$ 0.15 mmol $H_2(BDC)$ 0.15 mmol | $H_2O$ | 102.3 | 91.12 | 101.5 | 6.142 | 10.069 | 10.096 | P-1 |
| MOF-69A | $Zn(NO_3)_2 \cdot 6H_2O$ 0.083 mmol 4,4'-BPDC 0.041 mmol | DEF $H_2O_2$ $MeNH_2$ | 90 | 111.6 | 90 | 23.12 | 20.92 | 12 | C2/c |

-continued

| MOF-n | Constituents molar ratio M + L | Solvents | α | β | γ | a | b | c | Space group |
|---|---|---|---|---|---|---|---|---|---|
| MOF-69B | $Zn(NO_3)_2 \cdot 6H_2O$ 0.083 mmol 2,6-NCD 0.041 mmol | DEF $H_2O_2$ $MeNH_2$ | 90 | 95.3 | 90 | 20.17 | 18.55 | 12.16 | C2/c |
| MOF-11 $Cu_2(ATC)$ | $Cu(NO_3)_2 \cdot 2.5H_2O$ 0.47 mmol $H_2ATC$ 0.22 mmol | $H_2O$ | 90 | 93.86 | 90 | 12.987 | 11.22 | 11.336 | C2/c |
| MOF-11 $Cu_2(ATC)$ dehydr. | | | 90 | 90 | 90 | 8.4671 | 8.4671 | 14.44 | P42/mmc |
| MOF-14 $Cu_3$ (BTB) | $Cu(NO_3)_2 \cdot 2.5H_2O$ 0.28 mmol $H_3BTB$ 0.052 mmol | $H_2O$ DMF EtOH | 90 | 90 | 90 | 26.946 | 26.946 | 26.946 | Im-3 |
| MOF-32 Cd(ATC) | $Cd(NO_3)_2 \cdot 4H_2O$ 0.24 mmol $H_4ATC$ 0.10 mmol | $H_2O$ NaOH | 90 | 90 | 90 | 13.468 | 13.468 | 13.468 | P(−4)3m |
| MOF-33 $Zn_2$ (ATB) | $ZnCl_2$ 0.15 mmol $H_4ATB$ 0.02 mmol | $H_2O$ DMF EtOH | 90 | 90 | 90 | 19.561 | 15.255 | 23.404 | Imma |
| MOF-34 Ni(ATC) | $Ni(NO_3)_2 \cdot 6H_2O$ 0.24 mmol $H_4ATC$ 0.10 mmol | $H_2O$ NaOH | 90 | 90 | 90 | 10.066 | 11.163 | 19.201 | $P2_12_12_1$ |
| MOF-36 $Zn_2$ (MTB) | $Zn(NO_3)_2 \cdot 4H_2O$ 0.20 mmol $H_4MTB$ 0.04 mmol | $H_2O$ DMF | 90 | 90 | 90 | 15.745 | 16.907 | 18.167 | Pbca |
| MOF-39 $Zn_3O(HBTB)$ | $Zn(NO_3)_2\ 4H_2O$ 0.27 mmol $H_3BTB$ 0.07 mmol | $H_2O$ DMF EtOH | 90 | 90 | 90 | 17.158 | 21.591 | 25.308 | Pnma |
| NO305 | $FeCl_2 \cdot 4H_2O$ 5.03 mmol formic acid 86.90 mmol | DMF | 90 | 90 | 120 | 8.2692 | 8.2692 | 63.566 | R-3c |
| NO306A | $FeCl_2 \cdot 4H_2O$ 5.03 mmol formic acid 86.90 mmol | DEF | 90 | 90 | 90 | 9.9364 | 18.374 | 18.374 | Pbcn |
| NO29 MOF-0 similar | $Mn(Ac)_2 \cdot 4H_2O$ 0.46 mmol $H_3BTC$ 0.69 mmol | DMF | 120 | 90 | 90 | 14.16 | 33.521 | 33.521 | P-1 |
| BPR48 A2 | $Zn(NO_3)_2 \cdot 6H_2O$ 0.012 mmol $H_2BDC$ 0.012 mmol | DMSO Toluene | 90 | 90 | 90 | 14.5 | 17.04 | 18.02 | Pbca |
| BPR69 B1 | $Cd(NO_3)_2\ 4H_2O$ 0.0212 mmol $H_2BDC$ 0.0428 mmol | DMSO | 90 | 98.76 | 90 | 14.16 | 15.72 | 17.66 | Cc |
| BPR92 A2 | $Co(NO_3)_2 \cdot 6H_2O$ 0.018 mmol $H_2BDC$ 0.018 mmol | NMP | 106.3 | 107.63 | 107.2 | 7.5308 | 10.942 | 11.025 | P1 |
| BPR95 C5 | $Cd(NO_3)_2\ 4H_2O$ 0.012 mmol $H_2BDC$ 0.36 mmol | NMP | 90 | 112.8 | 90 | 14.460 | 11.085 | 15.829 | P2(1)/n |
| Cu $C_6H_4O_6$ | $Cu(NO_3)_2 \cdot 2.5H_2O$ 0.370 mmol $H_2BDC(OH)_2$ 0.37 mmol | DMF Chlorobenzene | 90 | 105.29 | 90 | 15.259 | 14.816 | 14.13 | P2(1)/c |
| M(BTC) MOF-0 similar | $Co(SO_4)\ H_2O$ 0.055 mmol $H_3BTC$ 0.037 mmol | DMF | | wie MOF-0 | | | | | |
| Tb($C_6H_4O_6$) | $Tb(NO_3)_3 \cdot 5H_2O$ 0.370 mmol $H_2(C_6H_4O_6)$ 0.56 mmol | DMF Chlorobenzene | 104.6 | 107.9 | 97.147 | 10.491 | 10.981 | 12.541 | P-1 |

-continued

| MOF-n | Constituents molar ratio M + L | Solvents | α | β | γ | a | b | c | Space group |
|---|---|---|---|---|---|---|---|---|---|
| Zn (C₂O₄) | ZnCl₂ 0.370 mmol oxalic acid 0.37 mmol | DMF Chlorobenzene | 90 | 120 | 90 | 9.4168 | 9.4168 | 8.464 | P(−3)1m |
| Co(CHO) | Co(NO₃)₂•5H₂O 0.043 mmol formic acid 1.60 mmol | DMF | 90 | 91.32 | 90 | 11.328 | 10.049 | 14.854 | P2(1)/n |
| Cd(CHO) | Cd(NO₃)₂•4H₂O 0.185 mmol formic acid 0.185 mmol | DMF | 90 | 120 | 90 | 8.5168 | 8.5168 | 22.674 | R-3c |
| Cu(C₃H₂O₄) | Cu(NO₃)₂•2.5H₂O 0.043 mmol malonic acid 0.192 mmol | DMF | 90 | 90 | 90 | 8.366 | 8.366 | 11.919 | P43 |
| Zn₆(NDC)₅ MOF-48 | Zn(NO₃)₂•6H₂O 0.097 mmol 14 NDC 0.069 mmol | DMF Chlorobenzene H₂O₂ | 90 | 95.902 | 90 | 19.504 | 16.482 | 14.64 | C2/m |
| MOF-47 | Zn(NO₃)₂ 6H₂O 0.185 mmol H₂(BDC[CH₃]₄) 0.185 mmol | DMF Chlorobenzene H₂O₂ | 90 | 92.55 | 90 | 11.303 | 16.029 | 17.535 | P2(1)/c |
| MO25 | Cu(NO₃)₂•2.5H₂O 0.084 mmol BPhDC 0.085 mmol | DMF | 90 | 112.0 | 90 | 23.880 | 16.834 | 18.389 | P2(1)/c |
| Cu-Thio | Cu(NO₃)₂•2.5H₂O 0.084 mmol thiophene dicarboxylic acid 0.085 mmol | DEF | 90 | 113.6 | 90 | 15.4747 | 14.514 | 14.032 | P2(1)/c |
| ClBDC1 | Cu(NO₃)₂•2.5H₂O 0.084 mmol H₂(BDCCl₂) 0.085 mmol | DMF | 90 | 105.6 | 90 | 14.911 | 15.622 | 18.413 | C2/c |
| MOF-101 | Cu(NO₃)₂•2.5H₂O 0.084 mmol BrBDC 0.085 mmol | DMF | 90 | 90 | 90 | 21.607 | 20.607 | 20.073 | Fm3m |
| Zn₃(BTC)₂ | ZnCl₂ 0.033 mmol H₃BTC 0.033 mmol | DMF EtOH base present | 90 | 90 | 90 | 26.572 | 26.572 | 26.572 | Fm-3m |
| MOF-j | Co(CH₃CO₂)₂•4H₂O (1.65 mmol) H₃(BZC) (0.95 mmol) | H₂O | 90 | 112.0 | 90 | 17.482 | 12.963 | 6.559 | C2 |
| MOF-n | Zn(NO₃)₂•6H₂O H₃(BTC) | Ethanol | 90 | 90 | 120 | 16.711 | 16.711 | 14.189 | P6(3)/mcm |
| PbBDC | Pb(NO₃)₂ (0.181 mmol) H₂(BDC) (0.181 mmol) | DMF Ethanol | 90 | 102.7 | 90 | 8.3639 | 17.991 | 9.9617 | P2(1)/n |
| Znhex | Zn(NO₃)₂•6H₂O (0.171 mmol) H₃BTB (0.114 mmol) | DMF p-Xylene Ethanol | 90 | 90 | 120 | 37.1165 | 37.117 | 30.019 | P3(1)c |
| AS16 | FeBr₂ 0.927 mmol H₂(BDC) 0.927 mmol | DMF anhydr. | 90 | 90.13 | 90 | 7.2595 | 8.7894 | 19.484 | P2(1)c |
| AS27-2 | FeBr₂ 0.927 mmol H₃(BDC) 0.464 mmol | DMF anhydr. | 90 | 90 | 90 | 26.735 | 26.735 | 26.735 | Fm3m |
| AS32 | FeCl₃ 1.23 mmol H₂(BDC) 1.23 mmol | DMF anhydr. Ethanol | 90 | 90 | 120 | 12.535 | 12.535 | 18.479 | P6(2)c |
| AS54-3 | FeBr₂ 0.927 BPDC 0.927 mmol | DMF anhydr. n-Propanol | 90 | 109.98 | 90 | 12.019 | 15.286 | 14.399 | C2 |

-continued

| MOF-n | Constituents molar ratio M + L | Solvents | α | β | γ | a | b | c | Space group |
|---|---|---|---|---|---|---|---|---|---|
| AS61-4 | FeBr$_2$ 0.927 mmol m-BDC 0.927 mmol | Pyridine anhydr. | 90 | 90 | 120 | 13.017 | 13.017 | 14.896 | P6(2)c |
| AS68-7 | FeBr$_2$ 0.927 mmol m-BDC 1.204 mmol | DMF anhydr. Pyridine | 90 | 90 | 90 | 18.3407 | 10.036 | 18.039 | Pca2$_1$ |
| Zn(ADC) | Zn(NO$_3$)$_2$·6H$_2$O 0.37 mmol H$_2$(ADC) 0.36 mmol | DMF Chlorobenzene | 90 | 99.85 | 90 | 16.764 | 9.349 | 9.635 | C2/c |
| MOF-12 Zn$_2$ (ATC) | Zn(NO$_3$)$_2$·6H$_2$O 0.30 mmol H$_4$(ATC) 0.15 mmol | Ethanol | 90 | 90 | 90 | 15.745 | 16.907 | 18.167 | Pbca |
| MOF-20 ZnNDC | Zn(NO$_3$)$_2$·6H$_2$O 0.37 mmol H$_2$NDC 0.36 mmol | DMF Chlorobenzene | 90 | 92.13 | 90 | 8.13 | 16.444 | 12.807 | P2(1)/c |
| MOF-37 | Zn(NO$_3$)$_2$·6H$_2$O 0.20 mmol H$_2$NDC 0.20 mmol | DEF Chlorobenzene | 72.38 | 83.16 | 84.33 | 9.952 | 11.576 | 15.556 | P-1 |
| Zn(NDC) (DMSO) | Zn(NO$_3$)$_2$·6H$_2$O H$_2$NDC | DMSO | 68.08 | 75.33 | 88.31 | 8.631 | 10.207 | 13.114 | P-1 |
| Zn(NDC) | Zn(NO$_3$)$_2$·6H$_2$O H$_2$NDC |  | 90 | 99.2 | 90 | 19.289 | 17.628 | 15.052 | C2/c |
| Zn(HPDC) | Zn(NO$_3$)$_2$·4H$_2$O 0.23 mmol H$_2$(HPDC) 0.05 mmol | DMF H$_2$O | 107.9 | 105.06 | 94.4 | 8.326 | 12.085 | 13.767 | P-1 |
| Co(HPDC) | Co(NO$_3$)$_2$·6H$_2$O 0.21 mmol H$_2$ (HPDC) 0.06 mmol | DMF H$_2$O/ Ethanol | 90 | 97.69 | 90 | 29.677 | 9.63 | 7.981 | C2/c |
| Zn$_3$(PDC)2.5 | Zn(NO$_3$)$_2$·4H$_2$O 0.17 mmol H$_2$(HPDC) 0.05 mmol | DMF/ ClBz H$_2$0/TEA | 79.34 | 80.8 | 85.83 | 8.564 | 14.046 | 26.428 | P-1 |
| Cd$_2$ (TPDC)2 | Cd(NO$_3$)$_2$·4H$_2$O 0.06 mmol H$_2$(HPDC) 0.06 mmol | Methanol/ CHP H$_2$O | 70.59 | 72.75 | 87.14 | 10.102 | 14.412 | 14.964 | P-1 |
| Tb(PDC)1.5 | Tb(NO$_3$)$_3$·5H$_2$O 0.21 mmol H$_2$(PDC) 0.034 mmol | DMF H$_2$O/ Ethanol | 109.8 | 103.61 | 100.14 | 9.829 | 12.11 | 14.628 | P-1 |
| ZnDBP | Zn(NO$_3$)$_2$·6H$_2$O 0.05 mmol dibenzyl phosphate 0.10 mmol | MeOH | 90 | 93.67 | 90 | 9.254 | 10.762 | 27.93 | P2/n |
| Zn$_3$(BPDC) | ZnBr$_2$ 0.021 mmol 4,4'BPDC 0.005 mmol | DMF | 90 | 102.76 | 90 | 11.49 | 14.79 | 19.18 | P21/n |
| CdBDC | Cd(NO$_3$)$_2$·4H$_2$O 0.100 mmol H$_2$(BDC) 0.401 mmol | DMF Na$_2$SiO$_3$ (aq) | 90 | 95.85 | 90 | 11.2 | 11.11 | 16.71 | P21/n |
| Cd-mBDC | Cd(NO$_3$)$_2$·4H$_2$O 0.009 mmol H$_2$(mBDC) 0.018 mmol | DMF MeNH$_2$ | 90 | 101.1 | 90 | 13.69 | 18.25 | 14.91 | C2/c |
| Zn$_4$OBNDC | Zn(NO$_3$)$_2$·6H$_2$O 0.041 mmol BNDC | DEF MeNH$_2$ H$_2$O$_2$ | 90 | 90 | 90 | 22.35 | 26.05 | 59.56 | Fmmm |
| Eu(TCA) | Eu(NO$_3$)$_3$·6H$_2$O 0.14 mmol TCA 0.026 mmol | DMF Chlorobenzene | 90 | 90 | 90 | 23.325 | 23.325 | 23.325 | Pm-3n |
| Tb(TCA) | Tb(NO$_3$)$_3$·6H$_2$O 0.069 mmol TCA 0.026 mmol | DMF Chlorobenzene | 90 | 90 | 90 | 23.272 | 23.272 | 23.372 | Pm-3n |

-continued

| MOF-n | Constituents molar ratio M + L | Solvents | α | β | γ | a | b | c | Space group |
|---|---|---|---|---|---|---|---|---|---|
| Formates | Ce(NO$_3$)$_3$•6H$_2$O 0.138 mmol formic acid 0.43 mmol | H$_2$O Ethanol | 90 | 90 | 120 | 10.668 | 10.667 | 4.107 | R-3m |
|  | FeCl$_2$•4H$_2$O 5.03 mmol formic acid 86.90 mmol | DMF | 90 | 90 | 120 | 8.2692 | 8.2692 | 63.566 | R-3c |
|  | FeCl$_2$•4H$_2$O 5.03 mmol formic acid 86.90 mmol | DEF | 90 | 90 | 90 | 9.9364 | 18.374 | 18.374 | Pbcn |
|  | FeCl$_2$•4H$_2$O 5.03 mmol formic acid 86.90 mmol | DEF | 90 | 90 | 90 | 8.335 | 8.335 | 13.34 | P-31c |
| NO330 | FeCl$_2$•4H$_2$O 0.50 mmol formic acid 8.69 mmol | Formamide | 90 | 90 | 90 | 8.7749 | 11.655 | 8.3297 | Pnna |
| NO332 | FeCl$_2$•4H$_2$O 0.50 mmol formic acid 8.69 mmol | DIP | 90 | 90 | 90 | 10.0313 | 18.808 | 18.355 | Pbcn |
| NO333 | FeCl$_2$•4H$_2$O 0.50 mmol formic acid 8.69 mmol | DBF | 90 | 90 | 90 | 45.2754 | 23.861 | 12.441 | Cmcm |
| NO335 | FeCl$_2$•4H$_2$O 0.50 mmol formic acid 8.69 mmol | CHF | 90 | 91.372 | 90 | 11.5964 | 10.187 | 14.945 | P21/n |
| NO336 | FeCl$_2$•4H$_2$O 0.50 mmol formic acid 8.69 mmol | MFA | 90 | 90 | 90 | 11.7945 | 48.843 | 8.4136 | Pbcm |
| NO13 | Mn(Ac)$_2$•4H$_2$O 0.46 mmol benzoic acid 0.92 mmol bipyridine 0.46 mmol | Ethanol | 90 | 90 | 90 | 18.66 | 11.762 | 9.418 | Pbcn |
| NO29 MOF-0 similar | Mn(Ac)$_2$•4H$_2$O 0.46 mmol H$_3$BTC 0.69 mmol | DMF | 120 | 90 | 90 | 14.16 | 33.521 | 33.521 | P-1 |
| Mn(hfac)$_2$ (O$_2$CC$_6$H$_5$) | Mn(Ac)$_2$•4H$_2$O 0.46 mmol Hfac 0.92 mmol bipyridine 0.46 mmol | Ether | 90 | 95.32 | 90 | 9.572 | 17.162 | 14.041 | C2/c |
| BPR43G2 | Zn(NO$_3$)$_2$•6H$_2$O 0.0288 mmol H$_2$BDC 0.0072 mmol | DMF CH$_3$CN | 90 | 91.37 | 90 | 17.96 | 6.38 | 7.19 | C2/c |
| BPR48A2 | Zn(NO$_3$)$_2$ 6H$_2$O 0.012 mmol H$_2$BDC 0.012 mmol | DMSO Toluene | 90 | 90 | 90 | 14.5 | 17.04 | 18.02 | Pbca |
| BPR49B1 | Zn(NO$_3$)$_2$ 6H$_2$O 0.024 mmol H$_2$BDC 0.048 mmol | DMSO Methanol | 90 | 91.172 | 90 | 33.181 | 9.824 | 17.884 | C2/c |
| BPR56E1 | Zn(NO$_3$)$_2$ 6H$_2$O 0.012 mmol H$_2$BDC 0.024 mmol | DMSO n-Propanol | 90 | 90.096 | 90 | 14.5873 | 14.153 | 17.183 | P2(1)/n |
| BPR68D10 | Zn(NO$_3$)$_2$ 6H$_2$O 0.0016 mmol H$_3$BTC 0.0064 mmol | DMSO Benzene | 90 | 95.316 | 90 | 10.0627 | 10.17 | 16.413 | P2(1)/c |

-continued

| MOF-n | Constituents molar ratio M + L | Solvents | α | β | γ | a | b | c | Space group |
|---|---|---|---|---|---|---|---|---|---|
| BPR69B1 | Cd(NO₃)₂ 4H₂O 0.0212 mmol H₂BDC 0.0428 mmol | DMSO | 90 | 98.76 | 90 | 14.16 | 15.72 | 17.66 | Cc |
| BPR73E4 | Cd(NO₃)₂ 4H₂O 0.006 mmol H₂BDC 0.003 mmol | DMSO Toluene | 90 | 92.324 | 90 | 8.7231 | 7.0568 | 18.438 | P2(1)/n |
| BPR76D5 | Zn(NO₃)₂ 6H₂O 0.0009 mmol H₂BzPDC 0.0036 mmol | DMSO | 90 | 104.17 | 90 | 14.4191 | 6.2599 | 7.0611 | Pc |
| BPR80B5 | Cd(NO₃)₂·4H₂O 0.018 mmol H₂BDC 0.036 mmol | DMF | 90 | 115.11 | 90 | 28.049 | 9.184 | 17.837 | C2/c |
| BPR80H5 | Cd(NO₃)₂ 4H₂O 0.027 mmol H₂BDC 0.027 mmol | DMF | 90 | 119.06 | 90 | 11.4746 | 6.2151 | 17.268 | P2/c |
| BPR82C6 | Cd(NO₃)₂ 4H₂O 0.0068 mmol H₂BDC 0.202 mmol | DMF | 90 | 90 | 90 | 9.7721 | 21.142 | 27.77 | Fdd2 |
| BPR86C3 | Co(NO₃)₂ 6H₂O 0.0025 mmol H₂BDC 0.075 mmol | DMF | 90 | 90 | 90 | 18.3449 | 10.031 | 17.983 | Pca2(1) |
| BPR86H6 | Cd(NO₃)₂·6H₂O 0.010 mmol H₂BDC 0.010 mmol | DMF | 80.98 | 89.69 | 83.412 | 9.8752 | 10.263 | 15.362 | P-1 |
|  | Co(NO₃)₂ 6H₂O | NMP | 106.3 | 107.63 | 107.2 | 7.5308 | 10.942 | 11.025 | P1 |
| BPR95A2 | Zn(NO₃)₂ 6H₂O 0.012 mmol H₂BDC 0.012 mmol | NMP | 90 | 102.9 | 90 | 7.4502 | 13.767 | 12.713 | P2(1)/c |
| CuC₆F₄O₄ | Cu(NO₃)₂·2.5H₂O 0.370 mmol H₂BDC(OH)₂ 0.37 mmol | DMF Chlorobenzene | 90 | 98.834 | 90 | 10.9675 | 24.43 | 22.553 | P2(1)/n |
| Fe Formic | FeCl₂·4H₂O 0.370 mmol formic acid 0.37 mmol | DMF | 90 | 91.543 | 90 | 11.495 | 9.963 | 14.48 | P2(1)/n |
| Mg Formic | Mg(NO₃)₂·6H₂O 0.370 mmol formic acid 0.37 mmol | DMF | 90 | 91.359 | 90 | 11.383 | 9.932 | 14.656 | P2(1)/n |
| MgC₆H₄O₆ | Mg(NO₃)₂·6H₂O 0.370 mmol H₂BDC(OH)₂ 0.37 mmol | DMF | 90 | 96.624 | 90 | 17.245 | 9.943 | 9.273 | C2/c |
| Zn C₂H₄BDC MOF-38 | ZnCl₂ 0.44 mmol CBBDC 0.261 mmol | DMF | 90 | 94.714 | 90 | 7.3386 | 16.834 | 12.52 | P2(1)/n |
| MOF-49 | ZnCl₂ 0.44 mmol m-BDC 0.261 mmol | DMF CH₃CN | 90 | 93.459 | 90 | 13.509 | 11.984 | 27.039 | P2/c |
| MOF-26 | Cu(NO₃)₂·5H₂O 0.084 mmol DCPE 0.085 mmol | DMF | 90 | 95.607 | 90 | 20.8797 | 16.017 | 26.176 | P2(1)/n |
| MOF-112 | Cu(NO₃)₂·2.5H₂O 0.084 mmol o-Br-m-BDC 0.085 mmol | DMF Ethanol | 90 | 107.49 | 90 | 29.3241 | 21.297 | 18.069 | C2/c |
| MOF-109 | Cu(NO₃)₂·2.5H₂O 0.084 mmol KDB 0.085 mmol | DMF | 90 | 111.98 | 90 | 23.8801 | 16.834 | 18.389 | P2(1)/c |

-continued

| MOF-n | Constituents molar ratio M + L | Solvents | α | β | γ | a | b | c | Space group |
|---|---|---|---|---|---|---|---|---|---|
| MOF-111 | $Cu(NO_3)_2 \cdot 2.5H_2O$ 0.084 mmol o-BrBDC 0.085 mmol | DMF Ethanol | 90 | 102.16 | 90 | 10.6767 | 18.781 | 21.052 | C2/c |
| MOF-110 | $Cu(NO_3)_2 \cdot 2.5H_2O$ 0.084 mmol thiophene dicarboxylic acid 0.085 mmol | DMF | 90 | 90 | 120 | 20.0652 | 20.065 | 20.747 | R-3/m |
| MOF-107 | $Cu(NO_3)_2 \cdot 2.5H_2O$ 0.084 mmol thiophene dicarboxylic acid 0.085 mmol | DEF | 104.8 | 97.075 | 95.206 | 11.032 | 18.067 | 18.452 | P-1 |
| MOF-108 | $Cu(NO_3)_2 \cdot 2.5H_2O$ 0.084 mmol thiophene dicarboxylic acid 0.085 mmol | DBF/ Methanol | 90 | 113.63 | 90 | 15.4747 | 14.514 | 14.032 | C2/c |
| MOF-102 | $Cu(NO_3)_2 \cdot 2.5H_2O$ 0.084 mmol $H_2(BDCCl_2)$ 0.085 mmol | DMF | 91.63 | 106.24 | 112.01 | 9.3845 | 10.794 | 10.831 | P-1 |
| Clbdc1 | $Cu(NO_3)_2 \cdot 2.5H_2O$ 0.084 mmol $H_2(BDCCl_2)$ 0.085 mmol | DEF | 90 | 105.56 | 90 | 14.911 | 15.622 | 18.413 | P-1 |
| Cu(NMOP) | $Cu(NO_3)_2 \cdot 2.5H_2O$ 0.084 mmol NBDC 0.085 mmol | DMF | 90 | 102.37 | 90 | 14.9238 | 18.727 | 15.529 | P2(1)/m |
| Tb(BTC) | $Tb(NO_3)_3 \cdot 5H_2O$ 0.033 mmol $H_3BTC$ 0.033 mmol | DMF | 90 | 106.02 | 90 | 18.6986 | 11.368 | 19.721 | |
| $Zn_3(BTC)_2$ Honk | $ZnCl_2$ 0.033 mmol $H_3BTC$ 0.033 mmol | DMF Ethanol | 90 | 90 | 90 | 26.572 | 26.572 | 26.572 | Fm-3m |
| $Zn_4O(NDC)$ | $Zn(NO_3)_2 \cdot 4H_2O$ 0.066 mmol 14NDC 0.066 mmol | DMF Ethanol | 90 | 90 | 90 | 41.5594 | 18.818 | 17.574 | aba2 |
| CdTDC | $Cd(NO_3)_2 \cdot 4H_2O$ 0.014 mmol thiophene 0.040 mmol DABCO 0.020 mmol | DMF $H_2O$ | 90 | 90 | 90 | 12.173 | 10.485 | 7.33 | Pmma |
| IRMOF-2 | $Zn(NO_3)_2 \cdot 4H_2O$ 0.160 mmol o-Br-BDC 0.60 mmol | DEF | 90 | 90 | 90 | 25.772 | 25.772 | 25.772 | Fm-3m |
| IRMOF-3 | $Zn(NO_3)_2 \cdot 4H_2O$ 0.20 mmol $H_2N$-BDC 0.60 mmol | DEF Ethanol | 90 | 90 | 90 | 25.747 | 25.747 | 25.747 | Fm-3m |
| IRMOF-4 | $Zn(NO_3)_2 \cdot 4H_2O$ 0.11 mmol $[C_3H_7O]_2$-BDC 0.48 mmol | DEF | 90 | 90 | 90 | 25.849 | 25.849 | 25.849 | Fm-3m |
| IRMOF-5 | $Zn(NO_3)_2 \cdot 4H_2O$ 0.13 mmol $[C_5H_{11}O]_2$-BDC 0.50 mmol | DEF | 90 | 90 | 90 | 12.882 | 12.882 | 12.882 | Pm-3m |
| IRMOF-6 | $Zn(NO_3)_2 \cdot 4H_2O$ 0.20 mmol $[C_2H_4]$-BDC 0.60 mmol | DEF | 90 | 90 | 90 | 25.842 | 25.842 | 25.842 | Fm-3m |
| IRMOF-7 | $Zn(NO_3)_2 \cdot 4H_2O$ 0.07 mmol 1,4NDC 0.20 mmol | DEF | 90 | 90 | 90 | 12.914 | 12.914 | 12.914 | Pm-3m |

-continued

| MOF-n | Constituents molar ratio M + L | Solvents | α | β | γ | a | b | c | Space group |
|---|---|---|---|---|---|---|---|---|---|
| IRMOF-8 | Zn(NO$_3$)$_2$·4H$_2$O 0.55 mmol 2,6NDC 0.42 mmol | DEF | 90 | 90 | 90 | 30.092 | 30.092 | 30.092 | Fm-3m |
| IRMOF-9 | Zn(NO$_3$)$_2$·4H$_2$O 0.05 mmol BPDC 0.42 mmol | DEF | 90 | 90 | 90 | 17.147 | 23.322 | 25.255 | Pnnm |
| IRMOF-10 | Zn(NO$_3$)$_2$·4H$_2$O 0.02 mmol BPDC 0.012 mmol | DEF | 90 | 90 | 90 | 34.281 | 34.281 | 34.281 | Fm-3m |
| IRMOF-11 | Zn(NO$_3$)$_2$·4H$_2$O 0.05 mmol HPDC 0.20 mmol | DEF | 90 | 90 | 90 | 24.822 | 24.822 | 56.734 | R-3m |
| IRMOF-12 | Zn(NO$_3$)$_2$·4H$_2$O 0.017 mmol HPDC 0.12 mmol | DEF | 90 | 90 | 90 | 34.281 | 34.281 | 34.281 | Fm-3m |
| IRMOF-13 | Zn(NO$_3$)$_2$·4H$_2$O 0.048 mmol PDC 0.31 mmol | DEF | 90 | 90 | 90 | 24.822 | 24.822 | 56.734 | R-3m |
| IRMOF-14 | Zn(NO$_3$)$_2$·4H$_2$O 0.17 mmol PDC 0.12 mmol | DEF | 90 | 90 | 90 | 34.381 | 34.381 | 34.381 | Fm-3m |
| IRMOF-15 | Zn(NO$_3$)$_2$·4H$_2$O 0.063 mmol TPDC 0.025 mmol | DEF | 90 | 90 | 90 | 21.459 | 21.459 | 21.459 | Im-3m |
| IRMOF-16 | Zn(NO$_3$)$_2$·4H$_2$O 0.0126 mmol TPDC 0.05 mmol | DEF NMP | 90 | 90 | 90 | 21.49 | 21.49 | 21.49 | Pm-3m |

ADC Acetylenedicarboxylic acid
NDC Naphthalenedicarboxylic acid
BDC Benzenedicarboxylic acid
ATC Adamantanetetracarboxylic acid
BTC Benzenetricarboxylic acid
BTB Benzenetribenzoic acid
MTB Methanetetrabenzoic acid
ATB Adamantanetetrabenzoic acid
ADB Adamantanedibenzoic acid Further metal-organic framework materials are MOF-2 to 4, MOF-9, MOF-31 to 36, MOF-39, MOF-69 to 80, MOF103 to 106, MOF-122, MOF-125, MOF-150, MOF-177, MOF-178, MOF-235, MOF-236, MOF-500, MOF-501, MOF-502, MOF-505, IRMOF-1, IRMOF-61, IRMOP-13, IRMOP-51, MIL-17, MIL-45, MIL-47, MIL-53, MIL-59, MIL-60, MIL-61, MIL-63, MIL-68, MIL-79, MIL-80, MIL-83, MIL-85, CPL-1 to 2, SZL-1 which are described in the literature.

In particular preference is given to a porous metal-organic framework material in which Zn, Mg, Ca, Fe, Al, Ni or Cu is present as metal ion and the at least bidentate organic compound is terephthalic acid, isophthalic acid, 2,6-naphthalenedicarboxylic acid or 1,3,5-benzenetricarboxylic acid.

In addition to the conventional method for producing the metal-organic framework materials, as is described, for example, in U.S. Pat. No. 5,648,508, they can also be produced in an electrochemical manner. In this respect, reference is made to WO-A 2005/049892. The MOFs produced in this manner exhibit particularly good properties in connection with the adsorption and desorption of chemical substances, in particular gases. In this way they are differentiated from those which are produced conventionally, even when they are formed from the same organic and metal-ion constituents. In the context of the present invention, electrochemically produced MOFs are particularly preferred.

Accordingly, the electrochemical production relates to a crystalline porous metal-organic framework material comprising at least one, at least bidentate, organic compound bound by coordination to at least one metal ion, which at least one metal ion is produced in a reaction medium comprising the at least one bidentate organic compound by oxidation of at least one anode comprising the corresponding metal.

The term "electrochemical production" designates a production method in which the formation of at least one reaction product is associated with the migration of electric charges or the occurrence of electric potentials.

The term "at least one metal ion", as used in connection with the electrochemical production, designates embodiments according to which at least one ion of a metal or at least one ion of a first metal and at least one ion of at least one second metal different from the first metal are provided by anodic oxidation.

Accordingly, the electrochemical production comprises embodiments in which at least one ion of at least one metal is provided by anodic oxidation and at least one ion of at least one metal is provided by a metal salt, the at least one metal in the metal salt and the at least one metal which is provided as metal ion via anodic oxidation being able to be identical or different from one another. Therefore, the present invention, in relation to electrochemically produced MOFs comprises, for example, an embodiment according to which the reaction medium comprises one or more different salts of a metal and the metal ion present in this salt or in these salts is additionally provided by anodic oxidation of at least one anode comprising this metal. Likewise, the reaction medium can comprise one or more different salts of at least one metal and at least one metal different from these metals can be provided via anodic oxidation as metal ion in the reaction medium.

According to a preferred embodiment of the present invention in connection with the electrochemical production, the at least one metal ion is provided by anodic oxidation of at least one anode comprising this at least one metal, no further metal being provided via a metal salt.

The term "metal", as used in the context of the present invention in connection with the electrochemical production of MOFs, comprises all elements of the Periodic Table of the Elements which can be provided via anodic oxidation in the electrochemical method in a reaction medium and are able with at least one at least bidentate organic compounds to form at least one metal-organic porous framework material.

The porous metal-organic framework material according to the present invention comprises, in its pores, a polymer which is suitable for adsorbing at least one substance which can in addition be taken up by the porous metal-organic framework material.

The polymer which is at least in part taken up at least in a part of the pores of the framework material can of course be present not only in the pores. Rather, it can additionally be in contact with the framework material outside the pores, for example at its surface.

In the context of the present invention, the term "polymer" is also used for polymer mixtures for the sake of simplicity. For instance, at least in part, at least a part of the pores of the framework material can comprise one or more polymers and/ or a plurality of pores can have one or more identical or different polymers.

Preferably, the pore volume which is given by the sums of the pore volumes of all pores of the framework material, is not completely occupied by polymer.

It is preferred that at least 5% by weight and at most 95% by weight of the maximum possible amount taken up in the framework material of the polymer-forming monomer(s) are used in the polymerization. The maximum amount which can be taken up can be determined by means of Fisher-Mottlau titration. If a plurality of monomers are used for the polymerization, the amount to be used is guided by the monomer whose maximum take up capacity for the framework material is lowest. More preferably, the amount is 10% by weight to 80% by weight, in addition more preferably 20% by weight to 60% by weight, of the maximum amount which can be taken up.

In addition, there is the possibility, in particular when the monomer or the monomers are present in liquid form, of first determining the maximum take up of the monomer or the monomers by the porous metal-organic framework material and subsequently adding the desired proportion of this amount to the porous metal-organic framework material.

The porous metal-organic framework material according to the present invention is to be suitable to take up at least one substance, in which case the take up can be additionally increased by an additional adsorption of the at least one substance to the polymer, so that the porous metal-organic framework material according to the present invention, compared with the porous metal-organic framework material as such from the prior art, can take up a larger amount of the at least one substance.

The at least one substance can be a gas or a liquid. Preferably the substance is a gas.

In the context of the present invention, for simplicity the terms "gas" and "liquid" are used, but in this case, here, the term "gas" or "liquid" is likewise to be taken to mean gas mixtures and also liquid mixtures or liquid solutions, respectively.

Preferred gases are hydrogen, alkanes, in particular methane, ethane, propane, n-butane and also isobutane, carbon monoxide, carbon dioxide, nitrogen oxides, oxygen, sulfur oxides, halogens, noble gases, in particular helium, neon, argon, krypton and also xenon.

In particular preference is given to energy sources such as hydrogen, natural gas, town gas, methane, propane, butane.

The at least one substance, however, can also be a liquid. Examples of such a liquid are disinfectants, inorganic or organic solvents, motive-power fuels, in particular gasoline or diesel, hydraulic fluid, cooling fluid, brake fluid or an oil, in particular machine oil. In addition, the liquid can be halogenated aliphatic or aromatic, cyclic or acyclic hydrocarbons or mixtures thereof. In particular, the liquid can be acetone, acetonitrile, aniline, anisole, benzene, benzonitrile, bromobenzene, butanol, tert-butanol, quinoline, chlorobenzene, chloroform, cyclohexane, diethylene glycol, diethyl ether, dimethylacetamide, dimethylformamide, dimethyl sulfoxide, dioxane, glacial acetic acid, acetic anhydride, ethyl acetate, ethanol, ethylene carbonate, ethylene dichloride, ethylene glycol, ethylene glycol dimethyl ether, formamide, hexane, isopropanol, methanol, methoxypropanol, 3-methyl-1-butanol, methylene chloride, methyl ethyl ketone, N-methylformamide, N-methylpyrrolidone, nitrobenzene, nitromethane, piperidine, propanol, propylene carbonate, pyridine, carbon disulfide, sulfolane, tetrachloroethene, carbon tetrachloride, tetrahydrofuran, toluene, 1,1,1-trichloroethane, trichloroethylene, triethylamine, triethylene glycol, triglyme, water or mixtures thereof.

In addition, the at least one substance can be an odor substance.

Preferably, the odor substance is a volatile organic or inorganic compound which comprises at least one of the elements nitrogen, phosphorus, oxygen, sulfur, fluorine, chlorine, bromine or iodine, or is an unsaturated or aromatic hydrocarbon or a saturated or unsaturated aldehyde or ketone. More preferred elements are nitrogen, oxygen, phosphorus, sulfur, chlorine, bromine; in particular preference is given to nitrogen, oxygen, phosphorus and sulfur.

In particular, the odor substance is ammonia, hydrogen sulfide, sulfur oxides, nitrogen oxides, ozone, cyclic or acyclic amines, thiols, thioethers and also aldehydes, ketones, esters, ethers, acids or alcohols. Particular preference is given to ammonia, hydrogen sulfide, organic acids (preferably acetic acid, propionic acid, butyric acid, isobutyric acid, valeric acid, isovaleric acid, caproic acid, heptylic acid, lauric acid, perlargonic acid) and also cyclic or acyclic hydrocarbons which comprise nitrogen or sulfur and also saturated or unsaturated aldehydes, such as hexanal, heptanal, octanal, nonanal, decanal, octenal or nonenal and, in particular, volatile aldehydes such as butyraldehyde, propionaldehyde, acetaldehyde and formaldehyde and furthermore motive-power fuels such as gasoline, diesel (constituents).

The odor substances can be fragrances which are used, for example for producing perfumes. Fragrances or oils which release such fragrances which may be mentioned by way of example are: essential oils, basil oil, geranium oil, mint oil, cananga oil, cardamom oil, lavender oil, peppermint oil, nutmeg oil, camille oil, eucalyptus oil, rosemary oil, lemon oil, lime oil, orange oil, bergamot oil, clary sage oil, coriander oil, cypress oil, 1,1-dimethoxy-2-pherylethane, 2,4-dimethyl-4-phenyltetrahydrofuran, dimethyltetrahydrobenzaldehyde, 2,6-dimethyl-7-octen-2-ol, 1,2-diethoxy-3,7-dimethyl-2,6-octadiene, phenylacetaldehyde, rose oxide, ethyl 2-methylpentanoate, 1-(2,6,6-trimethyl-1,3-cyclohexadien-1-yl)-2-buten-1-one, ethylvanillin, 2,6-dimethyl-2-octenol, 3,7-dimethyl-2-octenol, tert-butyl cyclohexylacetate, anisyl acetates, allyl cyclohexyloxyacetate, ethyllinalool, eugenol, coumarin, ethyl acetoacetate, 4-phenyl-2,4,6-trimethyl-1,3-dioxane, 4-methylene-3,5,6,6-tetramethyl-2-heptanone, ethyl tetrahydrosafranate, geranylnitrile, cis-3-hexen-1-ol, cis-3-hexenyl acetate, cis-3-hexenyl methyl carbonates, 2,6-dimethyl-5-hepten-1-al, 4-(tricyclo[5.2.1.0]decylidene)-8-butanal, 5-(2,2,3-trimethyl-3-cyclopentenyl)-3-methylpentan-2-ol, p-tert-butyl-alpha-methylhydrocinnamaldehyde, ethyl [5.2.1.0]tricyclodecanecarboxylate, geraniol, citronellol, citral, linalool, linalyl acetate, ionones, phenylethanol or mixtures thereof.

In the context of the present invention, a volatile odor substance preferably has a boiling point or boiling range of below 300° C. More preferably, the odor substance is a highly volatile compound or mixture. In particular preferably, the odor substance has a boiling point or boiling range of below 250° C., more preferably below 230° C., in particular preferably below 200° C.

Preference is likewise given to odor substances which have a high volatility. The vapor pressure can be used as index of the volatility. In the context of the present invention, a volatile odor substance preferably has a vapor pressure of greater than 0.001 kPa (20° C.). More preferably, the odor substance is a highly volatile compound or mixture. In particular preferably, the odor substance has a vapor pressure of greater than 0.01 kPa (20° C.), more preferably a vapor pressure of greater than 0.05 kPa (20° C.). Particularly preferably, the odor substances have a vapor pressure of greater than 0.1 kPa (20° C.).

The porous metal-organic framework material according to the present invention comprises a polymer which is likewise suitable for adsorbing the at least one substance.

Preferably, the polymer comprises double bonds, very particularly preferably conjugated double bonds, and in particular aromatic rings and/or functional groups, such as ether, sulfide, amine, ester, amide, sulfamide, carbonate, urethane groups.

The polymer is preferably an aromatic polymer and/or a polyamide and/or a polyester and/or a polyether and/or a polyacetal and/or a polycarbonate and/or a polyacrylate. Particular preference is given to polyesters.

Preferred monomers which can form the polymer are vinylogous compounds, in particular vinyl compounds in which the vinyl double bond is conjugated to further conjugated double bonds of the monomer compound. Suitable monomers are styrene and also styrene derivatives, acrylates, butadiene, isoprene, acrylamide, acrylonitrile, vinyl acetate, vinyl ethers, esters of acrylic and/or methacrylic acid with alkanols having 1 to 12 carbon atoms, vinyl alcohols, vinyl halides, vinyl pyrrolidone, vinyl carbazole, divinyl formal or vinyl esters and also unsaturated, if appropriate halogenated, hydrocarbons, such as isobutylene, butadiene, ethylene, propylene, tetrafluoroethylene. Cyclic or linear acetals can likewise be used. The monomers can be used for producing homopolymers or copolymers.

In addition, use can be made of epoxides as monomers, such as ethylene oxide, propylene oxide or butylene oxide.

In addition, there is the possibility of selecting the monomers in such a manner that they can undergo polycondensation. Such a reaction can be carried out, for example, starting from diols and diacids, or diamines and diacids. Polyols and also polyacids, in particular polycarboxylic acids, are likewise usable. Lactams and lactones such as caprolactam or caprolactone can also be used as polycondensing monomers, if appropriate in combination with other suitable bifunctional compounds.

Preferably, the polymer is a styrene-based polymer.

In the context of the present invention, a styrene-based polymer is present when at least one monomer which participates in the formation of the polymer is styrene or a styrene derivative.

Hereinafter, further polymers are listed which are suitable for taking up the at least one substance.

Generally, polycarbonates are usable. Polycarbonates can be obtained by polycondensation of carbonic acid with diols or polyols. Suitable diols or polyols have already been listed above.

In addition, polyoxymethylene copolymers are usable. The polyoxymethylene homopolymers or copolymers (POM) are known as such and are commercially available. They are customarily produced by polymerization of formaldehyde or, preferably, trioxane; in the production of copolymers, in addition, comonomers are co-used. Preferably, the monomers are selected from trioxane and other cyclic or linear formals or other formaldehyde sources.

Very generally, such POM polymers have at least 50 mol % of repeating units —$CH_2O$— in the main polymer chain. Suitable polyoxymethylene copolymers are in particular those which, in addition to the repeating units —$CH_2O$— further comprise up to 50 mol %, preferably 0.01 to 20 mol %, in particular 0.1 to 10 mol %, and very particularly preferably 0.5 to 6 mol % of repeating units

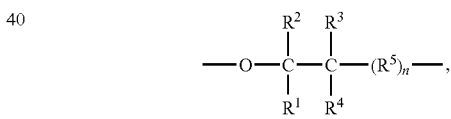

$R^1$ to $R^4$ independently of one another being a hydrogen atom, a $C_1$- to $C_4$-alkyl group or a halogen-substituted alkyl group having 1 to 4 carbon atoms and $R^5$ being a —$CH_2$—, —$CH_2O$—, a $C_1$- to $C_4$-alkyl or $C_1$- to $C_4$-haloalkyl-substituted methylene group or a corresponding oxymethylene group, and n having a value in the range from 0 to 3. Advantageously, these groups can be introduced into the copolymers by ring opening of cyclic ethers. Preferred cyclic ethers are those of the formula

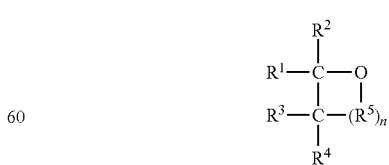

$R^1$ to $R^5$ and n having the meaning given above. Only by way of example, mention may be made of ethylene oxide, 1,2-propylene oxide, 1,2-butylene oxide, 1,3-butylene oxide, 1,3-dioxane, 1,3-dioxolane and 1,3-dioxepane (=butanediolformal, BUFO) as cyclic ethers, and also linear oligo- or polyformals such as polydioxolane or polydioxepane as comonomers. 1,3-Dioxolane and 1,3-dioxepane are particularly preferred comonomers.

Likewise suitable are oxymethylene terpolymers which are produced, for example, by reacting trioxane, one of the above-described cyclic ethers, with a third monomer, preferably bifunctional compounds of the formula

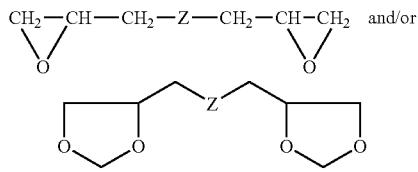

Z being a chemical bond, —O—, —ORO— (R equals $C_1$- to $C_8$-alkylene or $C_3$- to $C_8$-cycloalkylene).

Preferred monomers of this type are ethylenediglycide, diglycidyl ethers and diethers of glycidylene and formaldehyde, dioxane or trioxane in the molar ratio 2:1, and also diethers of 2 mol of glycidyl compound and 1 mol of an aliphatic diol having 2 to 8 carbon atoms, for example the diglycidyl ethers of ethylene glycol, 1,4-butanediol, 1,3-butanediol, cyclobutane-1,3-diol, 1,2-propanediol and cyclohexane-1,4-diol, to name just a few examples.

Generally, use can be made of polyesters based on dicarboxylic acids having aromatic or aliphatic or both an aliphatic and an aromatic part and an aliphatic or aromatic dihydroxy compound comprising an aliphatic part and an aromatic part can be used. Likewise, polyesters and polyalcohols are usable. In addition, monocarboxylic acids and monools can be used. Likewise, hydroxycarboxylic acids are usable. Obviously, in addition to the acids as monomer, their derivatives, such as esters, anhydrides or halides can also be used.

Diols or polyols which may be mentioned by way of example are ethylene glycol, 1,2- and/or 1,3-propanediol, diethylene glycol, dipropylene glycol, triethylene glycol, tripropylene glycol, tetraethylene glycol, 1,2- and/or 1,4-butanediol, 1,3-butylethylpropanediol, 1,3-methylpropanediol, 1,5-pentanediol, bisphenol A, B, C, F, norbornylene glycol, 1,4-benzyldimethanol and/or 1,4-benzyldiethanol, 2,4-dimethyl-2-ethylhexane-1,3-diol, cyclohexanedimethanol, dicidol, hexanediol, neopentyl glycol, trimethylolpropane, trimethylolethane, 1,2,6-trihydroxyhexaerythritol, glycerol, trishydroxyethylisocyanurate, pentaerythritol, sorbitol, xylitol, mannitol.

Examples of di-, tri- and tetracarboxylic acids have already been described in connection with the structure of the framework material. In this case, mention is to be made in particular of 1,2-cyclohexanedicarboxylic acid, 1,3-cyclohexanedicarboxylic acid, 1,4-cyclohexanedicarboxylic acid, methyltetrahydrophthalic acid, tetrahydrophthalic acid, methylhexahydrophthalic acid, phthalic acid, isophthalic acid, terephthalic acid, succinic acid, malonic acid, maleic acid, sebacic acid, dodecanedioic acid, adipic acid, azeleic acid, pyromellitic acid, trimellitic acid, isononanoic acid, 2-ethylhexanoic acid.

As a first group of preferred polyesters, mention may be made of polyalkylene terephthalates which have, in particular, 2 to 10 carbon atoms in the alcohol moiety.

Such polyalkylene terephthalates are known per se and are described in the literature. In the main chain they comprise an aromatic ring which originates from the aromatic dicarboxylic acid. The aromatic ring can also be substituted, e.g. by halogen such as chlorine and bromine, or by $C_1$-$C_4$-alkyl groups such as methyl, ethyl, isopropyl or n-propyl, and n-butyl, isobutyl or t-butyl groups.

These polyalkylene terephthalates can be produced by reacting aromatic dicarboxylic acids, their esters or other ester-forming derivatives with aliphatic dihydroxy compounds in a manner known per se.

Preferred dicarboxylic acids which may be mentioned are 2,6-naphthalenedicarboxylic acid, terephthalic acid and isophthalic acid or mixtures thereof. Up to 30 mol %, preferably no more than 10 mol %, of the aromatic dicarboxylic acids can be replaced by aliphatic or cycloaliphatic dicarboxylic acids such as adipic acid, azelaic acid, sebacic acid, dodecanedioic acids and cyclohexanedicarboxylic acids.

Of the aliphatic dihydroxy compounds, preference is given to diols having 2 to 6 carbon atoms, in particular 1,2-ethanediol, 1,3-propanediol, 1,4-butanediol, 1,6-hexanediol, 1,4-hexanediol, 1,4-cyclohexanediol, 1,4-cyclohexanedimethanol and neopentyl glycol or mixtures thereof.

Further preferred polyesters which may be mentioned are polyalkylene terephthalates which are derived from alkanediols having 2 to 6 carbon atoms. Of these, in particular, preference is given to polyethylene terephthalate, polypropylene terephthalate and polybutylene terephthalate or mixtures thereof. In addition, preference is given to PET and/or PBT which comprise up to 1% by weight, preferably up to 0.75% by weight, of 1,6-hexanediol and/or 2-methyl-1,5-pentanediol as further monomer units.

As a further group, mention is made of fully aromatic polyesters which are derived from aromatic dicarboxylic acids and aromatic dihydroxy compounds.

Suitable aromatic dicarboxylic acids are the compounds already described for the polyalkylene terephthalates. Preference is given to use of mixtures of 5 to 100 mol % isophthalic acid and 0 to 95 mol % terephthalic acid, in particular mixtures of about 80% terephthalic acid with 20% isophthalic acid up to about equivalent mixtures of these two acids.

The aromatic dihydroxy compounds preferably have the general formula

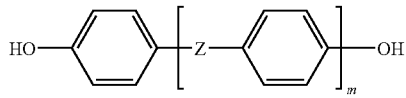

where Z is an alkylene or cycloalkylene group having up to 8 carbon atoms, an arylene group having up to 12 carbon atoms, a carbonyl group, a sulfonyl group, an oxygen atom or sulfur atom or a chemical bond and where m has the value 0 to 2. The compounds can also bear $C_1$-$C_6$-alkyl or alkoxy groups and fluorine, chlorine or bromine as substituents on the phenylene groups.

As parent bodies of these compounds, the following may be mentioned by way of example dihydroxybiphenyl, di-(hydroxyphenyl)alkane, di-(hydroxyphenyl)cycloalkane, di-(hydroxyphenyl)sulfide, di-(hydroxyphenyl)ether, di-(hydroxyphenyl)ketone, di-(hydroxyphenyl)sulfoxide, alpha, alpha'-di-(hydroxyphenyl)dialkylbenzene, di-(hydroxyphenyl)sulfone, di-(hydroxybenzoyl)benzene, resorcinol and hydroquinone, and also their nuclear-alkylated or nuclear-halogenated derivatives.

Of these, preference is given to 4,4'-dihydroxybiphenyl, 2,4-di-(4'-hydroxyphenyl)-2-methylbutane, alpha,alpha'-di- (4-hydroxyphenyl)-p-diisopropylbenzene, 2,2-di-(3'-methyl-4'-hydroxyphenyl)propane and 2,2-di-(3'-chloro-4'-hydroxyphenyl)propane, and also, in particular, 2,2-di-(4'-hydroxyphenyl)propane, 2,2-di-(3',5-dichlorodihydroxyphenyl)propane, 1,1-di-(4'-hydroxyphenyl)cyclohexane, 3,4'-dihydroxybenzophenone, 4,4'-dihydroxydiphenyl sulfone and 2,2-di-(3',5'-dimethyl-4'-hydroxyphenyl)propane or mixtures thereof.

Of course, mixtures of polyalkylene terephthalates and fully aromatic polyesters and/or polycarbonates can also be used. These generally comprise 20 to 98% by weight, preferably 80 to 96% by weight, of the polyalkylene terephthalate and 2 to 80% by weight, preferably 4 to 50% by weight, of the fully aromatic polyester and/or the polycarbonate.

In addition, preferably use is made of halogen-free polycarbonates. Suitable halogen-free polycarbonates are, for example, those based on diphenols of the general formula

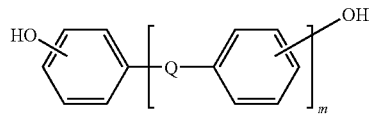

where Q is a single bond, a $C_1$-$C_8$-alkylene, a $C_2$-$C_3$-alkylidene, a $C_3$-$C_6$-cycloalkylidene group, a $C_6$-$C_{12}$-arylene group and also —O—, —S— or —SO$_2$— and m is an integer from 0 to 2.

The diphenols can also have substituents such as $C_1$-$C_6$-alkyl or $C_1$-$C_6$-alkoxy on the phenylene radicals.

Preferred diphenols of the formula are, for example, hydroquinone, resorcinol, 4,4'-dihydroxybiphenyl, 2,2-bis-(4-hydroxyphenyl)propane, 2,4-bis-(4-hydroxyphenyl)-2-methylbutane, 1,1-bis-(4-hydroxyphenyl)cyclohexane. Particular preference is given to 2,2-bis-(4-hydroxyphenyl) propane and 1,1-bis-(4-hydroxyphenyl)cyclohexane, and also 1,1-bis-(4-hydroxyphenyl)-3,3,5-trimethylcyclohexane.

Both homopolycarbonates and copolycarbonates can be suitable, preference is given, in addition to bisphenol A-homopolymer, to the copolycarbonates of bisphenol A.

The suitable polycarbonates can be branched in a known manner, more precisely preferably by incorporation of 0.05 to 2.0 mol %, based on the total of the diphenols used, of at least trifunctional compounds, for example those having three or more than three phenolic OH groups.

The diphenols of the general formula are known per se or can be produced by known methods.

The polycarbonates can be produced, for example, by reacting the diphenols with phosgene by the phase-boundary method or with phosgene by the method in a homogeneous phase (what is termed the pyridine method), the molecular weight to be established in each case being achieved in a known manner by an appropriate amount of known chain terminators. (With respect to polydiorganosiloxane-comprising polycarbonates, see DE-A 33 34 782, for example).

Suitable chain terminators are, for example, phenol, p-tert-butylphenol or else long-chain alkylphenols such as 4-(1,3-tetramethylbutyl)phenol according to DE-A 28 42 005 or monoalkylphenols or dialkylphenols having a total of 8 to 20 carbon atoms in the alkyl substituents according to DE-A 35 06 472, such as p-nonylphenol, 3,5-di-tert-butylphenol, p-tert-octylphenol, p-dodecylphenol, 2-(3,5-dimethylheptyl) phenol and 4-(3,5-dimethylheptyl)phenol.

Halogen-free polycarbonates in the context of the present invention means that the polycarbonates are made up of halogen-free diphenols, halogen-free chain terminators and if appropriate halogen-free branching points, the content of minor ppm amounts of saponifiable chlorine, resulting, for example, from the production of the polycarbonates using phosgene by the phase-boundary method, not being considered as halogen-comprising within the meaning of the invention. Such polycarbonates having ppm contents of saponifiable chlorine are halogen-free polycarbonates in the context of the present invention.

Amorphous polyestercarbonates are also mentioned as suitable, phosgene having been replaced in the production by aromatic dicarboxylic acid units such as isophthalic acid and/or terephthalic acid units. For further details reference may be made at this point to EP-A 711 810.

Further suitable copolycarbonates having cycloalkyl radicals as monomer units are described in EP-A 365 916.

In addition, bisphenol A can be replaced by bisphenol TMC.

Vinylaromatic polymers are also suitable.

Mention may be made here only as representatives of vinylaromatic polymers of styrene, chlorostyrene, alpha-methylstyrene and p-methylstyrene; in addition, comonomers such as (meth)acrylonitrile or (meth)acrylic esters can also participate in the structure. Particularly preferred vinylaromatic polymers are polystyrene and impact-modified polystyrene. Of course, mixtures of these polymers can also be used. They are preferably produced by the method described in EP-A-302 485.

Preferred ASA polymers are made up of a plasticized or rubbery phase from a graft polymer of:

$A_1$ 50 to 90% by weight of a graft substrate based on
$A_{11}$ 95 to 99.9% by weight of a $C_2$-$C_{10}$ alkylacrylate and
$A_{12}$ 0.1 to 5% by weight of a difunctional monomer having two olefinic non-conjugated double bonds and
$A_2$ 10 to 50% by weight of a graft superstrate of
$A_{21}$ 20 to 50% by weight of styrene or substituted styrenes or their mixtures and
$A_{22}$ 10 to 80% by weight of acrylonitrile, methacrylonitrile, acrylic esters or methacrylic esters or their mixtures, in a mixture with a hard matrix based on an SAN copolymer $A_3$) of:
$A_{31}$ 50 to 90% by weight, preferably 55 to 90% by weight, and in particular 65 to 85% by weight, styrene and/or substituted styrenes and
$A_{32}$ 10 to 50% by weight, preferably 10 to 45% by weight, and in particular 15 to 35% by weight, acrylonitrile and/or methacrylonitrile.

For production of the elastomer, as main monomer $A_{11}$), use is made of esters of acrylic acid having 2 to 10 carbon atoms, in particular 4 to 8 carbon atoms. As particularly preferred monomers, mention may be made here of tert-butyl, isobutyl and n-butyl acrylate, and also 2-ethylhexyl acrylate, of which the two last mentioned are particularly preferred.

In addition to these esters of acrylic acid, use is made of 0.1 to 5% by weight, in particular 1 to 4% by weight, based on the total weight $A_{11}+A_{12}$, of a polyfunctional monomer having at least two olefinic non-conjugated double bonds. Of these, difunctional compounds, i.e. having two non-conjugated double bonds, are preferably used. Examples which may be mentioned here are divinylbenzene, diallyl fumarate, diallyl phthalate, triallyl cyanurate, triallyl isocyanurate, tricyclodecenyl acrylate and dihydrodicyclopentadienyl acrylate, of which the two last mentioned are particularly preferred.

Methods for producing the graft substrate $A_1$ are known per se and are described, e.g., in DE-B 12 60 135.

In some cases production by emulsion polymerization has proved to be particularly advantageous.

The exact polymerization conditions, in particular type, metering and amount of the emulsifier, are preferably selected in such a manner that the latex of the acrylic ester which is at least partially crosslinked has a mean particle size (weighted mean $d_{50}$) in the range of about 200 to 700, in particular from 250 to 600 nm. Preferably, the latex has a narrow particle size distribution, i.e. the quotient $$Q = \frac{d_{90} - d_{10}}{d_{50}}$$

is preferably less than 0.5, in particular less than 0.35.

The fraction of the graft substrate $A_1$ to graft polymer $A_1+A_2$ is 50 to 90% by weight, preferably 55 to 85% by weight, and in particular 60 to 80% by weight, based on the total weight of $A_1+A_2$.

Graft substrate $A_1$ is grafted with a graft sheath $A_2$ obtainable by copolymerization of $A_{21}$ 20 to 90% by weight, preferably 30 to 90% by weight, and in particular 30 to 80% by weight, styrene or substituted styrenes of the general formula

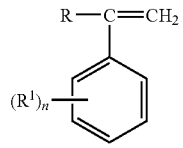

R being alkyl radicals having 1 to 8 carbon atoms, hydrogen atoms or halogen atoms and R being alkyl radicals having 1 to 8 carbon atoms or halogen atoms and n having the value 0, 1, 2 or 3, and $A_{22}$ 10 to 80% by weight, preferably 10 to 70% by weight, and in particular 20 to 70% by weight, acrylonitrile, methacrylonitrile, acrylic esters or methacrylic esters or mixtures thereof.

Examples of substituted styrenes are alpha-methylstyrene, p-methylstyrene, p-chlorostyrene and p-chloro-alpha-methylstyrene, of which styrene and alpha-methylstyrene are preferred.

Preferred acrylic and methacrylic esters are those whose homopolymers or copolymers with the other monomers of the component $A_{22}$) have glass transition temperatures of above 20 DEG C.; in principle, however, other acrylic esters can also be used, preferably in amounts such that in total for the component $A_2$ a glass transition temperature Tg above 20 DEG C. results.

Particular preference is given to esters of acrylic or methacrylic acid with $C_1$-$C_8$-alcohols and epoxy-containing esters such as glycidyl acrylate and glycidyl methacrylate. Very particularly preferred examples which may be mentioned are methyl methacrylate, tert-butyl methacrylate, glycidyl methacrylate and n-butyl acrylate, the latter preferably being used in not too great a fraction owing to its property of forming polymers having very low Tg.

The graft sheath $A_2$) can be produced in one or more, e.g. two or three, process steps, the gross composition remaining unaffected thereby.

Preferably, the graft sheath is produced in emulsion, as described, e.g., in DE-C 12 60 135, DE-A 32 27 555, DE-A 31 49 357 and DE-A 34 14 118.

Depending on the conditions selected, in the graft copolymerization a certain fraction of free copolymers of styrene or substituted styrene derivatives and (meth)acrylonitrile or (meth)acrylic esters is formed.

The graft copolymer $A_1+A_2$ generally has a mean particle size of 100 to 1000 nm, in particular from 200 to 700 nm, (d50-weighted mean). The conditions in production of the elastomer $D_1$) and in grafting are therefore preferably selected in such a manner that particle sizes in this range result. Measures for this are known and are described, e.g., in DE-C 12 60 135 and DE-A 28 26 925, and also in Journal of Applied Polymer Science, Vol. 9 (1965), pp. 2929 to 2938. The particle size increase of the latex of the elastomer can be effected, e.g., by means of agglomeration.

The graft polymer $(A_1+A_2)$, in the context of this invention, also encompasses the free, ungrafted homo- and copolymers formed in the graft copolymerization for producing component $A_2$).

Hereinafter, some preferred graft polymers may be listed:
1: 60% by weight graft substrate $A_1$ of
 $A_{11}$ 98% by weight n-butyl acrylate and
 $A_{12}$ 2% by weight dihydrodicyclopentadienyl acrylate and
 40% by weight graft sheath $A_2$ of
 $A_{21}$ 75% by weight styrene and
 $A_{22}$ 25% by weight acrylonitrile
2: graft substrate as in 1 having 5% by weight of a first graft sheath of styrene and 35% by weight of a second graft stage of
 $A_{21}$ 75% by weight styrene and
 $A_{22}$ 25% by weight acrylonitrile
3: graft substrate as in 1 having 13% by weight of a first graft stage of styrene and 27% by weight of a second graft stage of styrene and acrylonitrile in the weight ratio 3:1

The products present as component A3) can be produced, e.g., by the method described in DE-B 10 01 001 and DE-B 10 03 436.

ABS polymers exhibit the same structure as described above for ASA polymers. Instead of the acrylate rubber A1) of the graft substrate, in the ASA polymer, customarily use is made of conjugated dienes, so that preferably the following composition results for the graft substrate A4:

$A_{41}$ 70 to 100% by weight of a conjugated diene and
$A_{42}$ 0 to 30% by weight of a difunctional monomer having two olefinic non-conjugated double bonds Graft substrate $A_2$ and the hard matrix of the SAN copolymer $A_3$) remain unchanged in the composition. Such products are commercially available. The production methods are known to those skilled in the art, so that further statements on this respect are superfluous.

The weight ratio of $(A_4+A_2):A_3$ is in the range from 3:1 to 1:3, preferably from 2:1 to 1:2.

Particularly preferred compositions of the inventive molding compounds comprise a mixture of:
$A_1$) 10 to 90% by weight of a polybutylene terephthalate
$A_2$) 0 to 40% by weight of a polyethylene terephthalate
$A_3$) 1 to 40% by weight of an ASA or ABS polymer or their mixtures Further preferred compositions of the component A) comprise
$A_1$) 10 to 90% by weight of a polycarbonate
$A_2$) 0 to 40% by weight of a polyester, preferably polybutylene terephthalate,
$A_3$) 1 to 40% by weight of an ASA or ABS polymer or their mixtures.

In addition, polyamides can be suitable.

Examples of these are polyamides which are derived from lactams having 7 to 13 ring members, such as polycaprolactam, polycaprylolactam and polylaurolactam, and also polyamides which are obtained by reacting dicarboxylic acids with diamines.

As dicarboxylic acids, use can be made of alkanedicarboxylic acids having 6 to 12, in particular 6 to 10, carbon atoms, and aromatic dicarboxylic acids. Here, as acids, mention may be made merely of adipic acid, azelaic acid, sebacic acid, dodecanedioic acid and terephthalic and/or isophthalic acid.

Suitable diamines are, particularly, alkanediamines having 6 to 12, in particular 6 to 8, carbon atoms, and also m-xylenediamine, di-(4-aminophenyl)methane, di-(4-aminocyclohexyl)methane, 2,2-di-(4-aminophenyl)propane or 2,2-di-(4-aminocyclohexyl)propane.

Preferred polyamides are polyhexamethylene adipamide, polyhexamethylene sebacamide and polycaprolactam and also copolyamides 6/66, in particular having a fraction of 5 to 95% by weight of caprolactam units.

In addition, mention may also be made of polyamides which are obtainable, e.g., by condensation of 1,4-diaminobutane with adipic acid at elevated temperature (nylon 4,6). Production methods for polyamides of this structure are described, e.g., in EP-A 38 094, EP-A 38 582 and EP-A 39 524.

In addition, polyamides are suitable which are obtainable by copolymerization of two or more of the abovementioned monomers, or mixtures of a plurality of polyamides, the mixing ratio being optional.

In addition, those partly aromatic copolyamides such as nylon 6/6T and nylon 66/6T whose triamine content is less than 0.5% by weight, preferably less than 0.3% by weight have proved to be particularly advantageous (see EP-A 299 444).

In addition, use can be made of polyphenylene ethers which are known per se and are preferably produced by oxidative coupling of o-disubstituted phenols.

Examples of substituents which may be mentioned are halogen atoms such as chlorine or chromium and alkyl radicals having 1 to 4 carbon atoms which preferably do not have an alpha-position tertiary hydrogen atom, e.g. methyl, ethyl, propyl or butyl radicals. The alkyl radicals can in turn be substituted by halogen atoms such as chlorine or bromine or by a hydroxyl group. Further examples of possible substituents are alkoxy radicals, preferably having up to 4 carbon atoms, or if appropriate phenyl radicals substituted by halogen atoms and/or alkyl groups. Likewise suitable are copolymers of various phenols, for instance, e.g. copolymers of 2,6-dimethylphenol and 2,3,6-trimethylphenol. Of course, mixtures of different polyphenylene ethers can also be used.

The polyphenylene ethers used can if appropriate comprise method-specific absent sites, as are described, for example, in White et al., Macromolecules 23, 1318-1329 (1990).

Preferably, use is made of those polyphenylene ethers which are compatible with vinylaromatic polymers, i.e. are completely or substantially soluble in these polymers (see A. Noshay, Block Copolymers, pp. 8 to 10, Academic Press, 1977 and O. Olabisi, Polymer-Polymer Miscibility, 1979, pp. 117 to 189).

Examples of polyphenylene ethers are poly(2,6-dilauryl-1,4-phenylene) ether, poly(2,6-diphenyl-1,4-phenylene) ether, poly(2,6-dimethoxy-1,4-phenylene) ether, poly(2,6-diethoxy-1,4-phenylene) ether, poly(2-methoxy-6-ethoxy-1,4-phenylene) ether, poly(2-ethyl-6-stearyloxy-1,4-phenylene) ether, poly(2,6-dichloro-1,4-phenylene)ether, poly(2-methyl-6-phenyl-1,4-phenylene)ether, poly(2,6-dibenzyl-1,4-phenylene)ether, poly(2-ethoxy-1,4-phenylene)ether, poly(2-chloro-1,4-phenylene)ether, poly(2,5-dibromo-1,4-phenylene)ether. Preferably, use is made of polyphenylene ethers in which the substituents are alkyl radicals having 1 to 4 carbon atoms, such as poly(2,6-dimethyl-1,4-phenylene) ether, poly(2,6-diethyl-1,4-phenylene)ether, poly(2-methyl-6-ethyl-1,4-phenylene)ether, poly(2-methyl-6-propyl-1,4-phenylene)ether, poly(2,6-dipropyl-1,4-phenylene)ether and poly(2-ethyl-6-propyl-1,4-phenylene)ether.

In addition, graft copolymers of polyphenylene ether and vinylaromatic polymers such as styrene, alpha-methylstyrene, vinyltoluene and chlorostyrene are suitable.

Functionalized or modified polyphenylene ethers are known per se, e.g. from WO-A 86/02086, WO-A 87/00540, EP-A-222 246, EP-A-223 116 and EP-A-254 048 and are preferably used for mixtures with PA or polyester.

Customarily, an unmodified polyphenylene ether is modified by incorporation of at least one carbonyl, carboxylic acid, acid anhydride, acid amide, acid imide, carboxylic ester, carboxylate, amino, hydroxyl, epoxy, oxazoline, urethane, urea, lactam or halobenzyl group, so that sufficient compatibility e.g. with the polyamide, is ensured.

The modification is generally carried out by reacting an unmodified polyphenylene ether with a modifying agent which comprises at least one of the abovementioned groups and at least one C—C double bond or C—C triple bond, in solution (WO-A 86/2086), in aqueous dispersion, in a gas-phase method (EP-A-25 200) or in the melt, if appropriate in the presence of suitable vinylaromatic polymers or impact modifiers, with it optionally being possible for free-radical initiators to be present.

Suitable modifying agents are, for example, maleic acid, methylmaleic acid, itaconic acid, tetrahydrophthalic acid, their anhydrides and imides, fumaric acid, the monoesters and diesters of these acids, e.g. of $C_1$ and $C_2$-$C_8$-alkanols, the monoamides or diamides of these acids, such as N-phenylmaleimide, maleic hydrazide. In addition, mention may be made of, for example, N-vinylpyrrolidone and (meth)acryloylcaprolactam.

Preferably, use is made of a modified polyphenylene ether which is obtainable by reacting $a_1$) 70 to 99.95% by weight, preferably 76.5 to 99.94% by weight, of an unmodified polyphenylene ether, $a_2$) 0 to 25% by weight, preferably 0 to 20% by weight, of a vinylaromatic polymer, $a_3$) 0.05 to 5% by weight, preferably 0.05 to 2.5% by weight, of at least one compound from the group formed of $a_{31}$) an alpha,beta-unsaturated dicarbonyl compound, $a_{32}$) an amide-comprising monomer having a polymerizable double bond and $a_{32}$) a lactam-comprising monomer having a polymerizable double bond, $a_4$) 0 to 5% by weight, preferably 0.01 to 0.09% by weight, of a free-radical initiator, the percentages by weight being based on the sum of $a_1$) to $a_4$) in the course of 0.5 to 15 minutes at 240 to 375 DEG C in suitable mixing and kneading units such as twin-screw extruders.

The vinylaromatic polymer $a_2$) is preferably to be compatible with the polyphenylene ether used, as described under 2.

Examples of preferred vinylaromatic polymers compatible with polyphenylene ethers are to be taken from the abovementioned monograph by Olabisi, pp. 224 to 230 and 245.

As free-radical initiators a₄), mention may be made of:

Di-(2,4-dichlorobenzoyl) peroxide, tert-butyl peroxide, di-(3,5,5-trimethylhexanol) peroxide, dilauroyl peroxide, didecanoyl peroxide, dipropionyl peroxide, dibenzoyl peroxide, tert-butyl peroxy-2-ethylhexoate, tert-butyl peroxydiethylacetate, tert-butyl peroxyisobutyrate, 1,1-di-tert-butyl peroxy-3,3,5-trimethylcyclohexane, tert-butyl peroxyisopropylcarbonate, tert-butyl peroxy-3,3,5-trimethylhexoate, tert-butyl peracetate, tert-butyl perbenzoate, butyl 4,4-di-tert-butylperoxyvalerate, 2,2-di-tert-butylperoxybutane, dicumyl peroxide, tert-butyl cumyl peroxide, 1,3-di-(tert-butylperoxyisopropyl)benzene and di-tert-butyl peroxide. Mention may likewise be made of organic hydroperoxides such as diisopropylbenzene monohydroperoxide, cumene hydroperoxide, tert-butyl hydroperoxide, p-methyl hydroperoxide and pinane hydroperoxide and also highly branched alkanes of the general structure

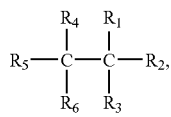

R to R being alkyl groups having 1 to 8 carbon atoms, alkoxy groups having 1 to 8 carbon atoms, aryl groups such as phenyl, naphthyl, or 5- or 6-membered heterocycles having one electron system and nitrogen, oxygen or sulfur as heteroatoms. The substituents $R^1$ to $R^6$ can themselves comprise functional groups as substituents, such as carboxyl, carboxyl derivative, hydroxyl, amino, thiol or epoxide groups. Examples are 2,3-dimethyl-2,3-diphenylbutane, 3,4-dimethyl-3,4-diphenylhexane and 2,2,3,3-tetraphenylbutane.

Particularly preferred polyphenylene ethers are obtained by modification using maleic acid, maleic anhydride and fumaric acid. Such polyphenylene ethers preferably have an acid number from 1.8 to 3.2, in particular from 2.0 to 3.0.

Further suitable thermoplastics which may be mentioned are thermoplastic polyurethanes (TPU), as are described, for example, in EP-A 115 846 and EP-A 115 847 and also EP-A 117 664.

Further suitable polymers which may be mentioned are polyolefins such as polyethylene and/or polypropylene homopolymers or copolymers, and also polyketones, polyarylene ethers (called HT thermoplastics), in particular polyethersulfones, polyvinyl chlorides, poly(meth)acrylates and also mixtures (blends) of all thermoplastics listed above.

In addition, use can be made of elastomers, such as, for example, the ethylene-propylene monomer (EPM) or ethylene-propylene-diene monomer (EPDM) rubbers.

EPM rubbers generally have virtually no more double bonds, whereas EPDM rubbers can have 1 to 20 double bonds/100 carbon atoms.

Diene monomers for EPDM rubbers which may be mentioned are, for example, conjugated dienes such as isoprene and butadiene, non-conjugated dienes having 5 to 25 carbon atoms such as penta-1,4-diene, hexa-1,4-diene, hexa-1,5-diene, 2,5-dimethylhexa-1,5-diene and octa-1,4-diene, cyclic dienes such as cyclopentadiene, cyclohexadiene, cyclooctadiene and dicyclopentadiene and also alkenylnorbornenes such as 5-ethylidene-2-norbornene, 5-butylidene-2-norbornene, 2-methallyl-5-norbornene, 2-isopropenyl-5-norbornene and tricyclodienes such as 3-methyltricyclo(5.2.1.0.2.6)-3,8-decadiene and mixtures thereof. Preference is given to hexa-1,5-diene, 5-ethylidenenorbornene and dicyclopentadiene. The diene content of the EPDM rubbers is preferably 0.5 to 50% by weight, in particular 1 to 8% by weight, based on the total weight of the rubber.

EPM and EPDM rubbers can also preferably be grafted to reactive carboxylic acids or their derivatives. Here, mention may be made of, e.g., acrylic acid, methacrylic acid and derivatives thereof, e.g. glycidyl (meth)acrylate, and also maleic anhydride.

A further group of preferred rubbers are copolymers of ethylene with acrylic acid and/or methacrylic acid and/or the esters of these acids. In addition, the rubbers can further comprise dicarboxylic acids such as maleic acid and fumaric acid, or derivatives of these acids, e.g. esters and anhydrides, and/or epoxy-comprising monomers. These dicarboxylic acid derivatives or epoxy-comprising monomers are preferably incorporated into the rubber by addition of dicarboxylic acid-comprising or epoxy-comprising monomers of the general formulae I or II or III or IV to the monomer mixture

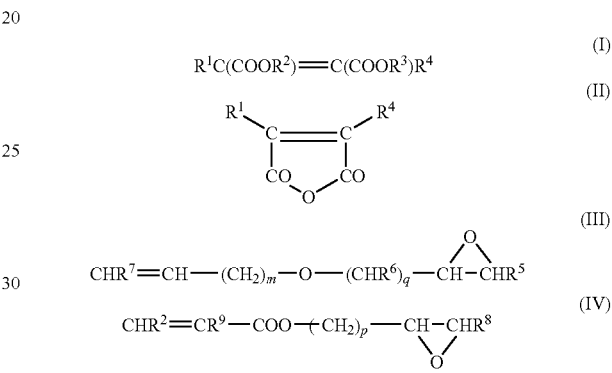

$R^1$ to $R^9$ being hydrogen or alkyl groups having 1 to 6 carbon atoms and m being an integer from 0 to 20, g an integer from 0 to 10, and p an integer from 0 to 5.

Preferably, the radicals $R^1$ to $R^9$ are hydrogen, m being 0 or 1, and g being 1. The corresponding compounds are maleic acid, fumaric acid, maleic anhydride, allyl glycidyl ether and vinyl glycidyl ether.

Preferred compounds of the formulae I, II and IV are maleic acid, maleic anhydride and epoxy-comprising esters of acrylic acid and/or methacrylic acid such as glycidyl acrylate, glycidyl methacrylate and the esters with tertiary alcohols, such as t-butyl acrylate. Although the latter do not have free carboxyl groups, they resemble the free acids in their behavior and are therefore termed latent carboxyl group monomers.

Advantageously, the copolymers comprise 50 to 98% by weight of ethylene, 0.1 to 20% by weight of epoxy-comprising monomers and/or methacrylic acid and/or acid anhydride-comprising monomers and also the remaining amount of (meth)acrylic esters.

Particular preference is given to copolymers of 50 to 98% by weight, in particular 55 to 95% by weight, ethylene, 0.1 to 40% by weight, in particular 0.3 to 20% by weight, glycidyl acrylate and/or glycidyl methacrylate, (meth) acrylic acid and/or maleic anhydride, and 1 to 45% by weight, in particular 10 to 40% by weight, n-butyl acrylate and/or 2-ethylhexyl acrylate.

Further preferred esters of acrylic and/or methacrylic acid are the methyl, ethyl, propyl and isobutyl and t-butyl esters.

In addition, vinyl esters and vinyl ethers can also be used as comonomers.

The above-described ethylene copolymers can be produced by methods known per se, preferably by random copolymerization at high pressure and elevated temperature. Corresponding methods are generally known.

Preferred elastomers are also emulsion polymers whose production is described, e.g. by Blackley in the monograph "Emulsion Polymerization". The emulsifiers and catalysts which can be used are known per se.

In principle, use can be made of homogeneously structured elastomers, or else those having a shell structure. The shell-type structure is determined by the addition sequence of the individual monomers; the morphology of the polymers is also affected by this addition sequence.

As monomers for the production of the rubber part of the elastomers, mention may be made here only as representatives of acrylates, such as, e.g. n-butyl acrylate and 2-ethylhexyl acrylate, corresponding methacrylates, butadiene and isoprene and also their mixtures. These monomers can be copolymerized with other monomers, e.g. styrene, acrylonitrile, vinyl ethers and further acrylates or methacrylates such as methyl methacrylate, or methyl acrylate, ethyl acrylate and propyl acrylate.

The plasticized or rubbery phase (having a glass transition temperature of below 0° C.) of the elastomers can be the core, the outer sheath or the central shell (in the case of elastomers having more than a two-shell structure); in the case of multi-shell elastomers, a plurality of shells can also comprise a rubbery phase.

If, in addition to the rubbery phase, one or more hard components (having glass transition temperatures of above 20° C.) further participate in the structure of the elastomer, these are generally produced by polymerizing styrene, acrylonitrile, methacrylonitrile, alpha-methylstyrene, p-methylstyrene, acrylic esters and methacrylic esters such as methyl acrylate, ethyl acrylate and methyl methacrylate as main monomers. In addition, smaller amounts of further comonomers can also be used here.

In some cases it has proved to be advantageous to use emulsion polymers which have reactive groups on the surface. Such groups are, e.g., epoxy, carboxyl, latent carboxyl, amino or amide groups, and also functional groups which can be introduced by co-use of monomers of the general formula

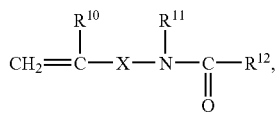

the substituents being able to have the following meaning:
$R^{10}$ hydrogen or a $C_1$-$C_4$-alkyl group,
$R^{11}$ hydrogen, a $C_1$-$C_8$-alkyl group or an aryl group, in particular phenyl,
$R^{12}$ hydrogen, a $C_1$-$C_{10}$-alkyl, a $C_6$-$C_{12}$-aryl group or —$OR^{13}$
$R^{13}$ a $C_1$-$C_8$-alkyl or $C_6$-$C_{12}$-aryl group which if appropriate can be substituted by O- or N-comprising groups,
X a chemical bond, a $C_1$-$C_{10}$-alkylene or $C_6$-$C_{12}$-arylene group or

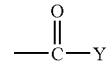

Y O—Z or NH—Z and
Z a $C_1$-$C_{10}$-alkylene or $C_6$-$C_{12}$-arylene group.

The graft monomers described in EP-A 208 187 are also suitable for introducing reactive groups at the surface.

As further examples, mention may also be made of acrylamide, methacrylamide and substituted esters of acrylic acid or methacrylic acid such as (N-tert-butylamino)ethyl methacrylate, (N,N-dimethylamino)ethyl acrylate, (N,N-dimethylamino)methyl acrylate and (N,N-diethylamino)ethyl acrylate.

In addition, the particles of the rubbery phase can also be crosslinked. Monomers acting as crosslinkers are, for example, buta-1,3-diene, divinylbenzene, diallyl phthalate and dihydrodicyclopentadienyl acrylate, and also the compounds described in EP-A 50 265.

In addition what are termed graft-linking monomers can also be used, i.e. monomers having two or more polymerizable double bonds which react at different rates during the polymerization. Preferably, use is made of those compounds in which at least one reactive group polymerizes at about the same rate as the remaining monomers, while the other reactive group (or reactive groups) polymerizes (polymerize), e.g., markedly more slowly. The different polymerization rates are accompanied by a certain fraction of unsaturated double bonds in the rubber. If subsequently a further phase is grafted onto such a rubber, the double bonds present in the rubber react at least in part with the graft monomers forming chemical bonds, i.e. the grafted phase is at least in part linked to the graft substrate via chemical bonds.

Examples of such graft-linking monomers are allyl-comprising monomers, in particular allyl esters of ethylenically unsaturated carboxylic acids, such as allyl acrylate, allyl methacrylate, diallyl maleate, diallyl fumarate, diallyl itaconate, or the corresponding monoallyl compounds of these dicarboxylic acids. In addition, there is a multitude of further suitable graft-linking monomers; for further details reference may be made here, for example, to U.S. Pat. No. 4,148,846.

Generally, the fraction of these crosslinking monomers of the impact-modifying polymer is up to 5% by weight, preferably no more than 3% by weight, based on the impact-modifying polymer.

Hereafter, some preferred emulsion polymers may be set forth. First mentioned here are graft polymers having a core and at least one outer shell which have the following structure:

| Type | Monomers for the core | Monomers for the sheath |
|------|----------------------|------------------------|
| I | buta-1,3-diene, isoprene, n-butyl acrylate, ethylhexyl acrylate or mixtures thereof | styrene, acrylonitrile, methyl methacrylate |
| II | as I but with co-use of crosslinkers | as I |
| III | as I or II | n-butyl acrylate, ethyl acrylate, methyl acrylate, buta-1,3-diene, isoprene, ethylhexyl acrylate |

-continued

| Type | Monomers for the core | Monomers for the sheath |
|---|---|---|
| IV | as I or II | as I or III but with co-use of monomers having reactive groups as described herein |
| V | styrene, acrylonitrile, methyl methacrylate or their mixtures | first sheath of monomers as described under I and II for the core second sheath as described under I or IV for the sheath |

Instead of graft polymers having a multishell structure, use can also be made of homogeneous, i.e. single-shell elastomers, of buta-1,3-diene, isoprene and n-butyl acrylate or their copolymers. These products can also be produced by co-use of crosslinking monomers or monomers having reactive groups.

Examples of preferred emulsion polymers are n-butyl acrylate/(meth)acrylic acid copolymers, n-butyl acrylate/glycidyl acrylate or n-butyl acrylate/glycidyl methacrylate copolymers, graft polymers having an inner core of n-butyl acrylate or butadiene-based and an outer sheath of the above-mentioned copolymers, and copolymers of ethylene with comonomers which supply reactive groups.

The elastomers described can also be produced by other customary methods, e.g. by suspension polymerization.

Silicone rubbers, as described in DE-A 37 25 576, EP-A 235 690, DE-A 38 00 603 and EP-A 319 290, are likewise preferred.

It will be appreciated that mixtures of the rubber types set forth above can also be used.

In addition, in the polymer formation, fillers and additives can also be used. Suitable additives are known to those skilled in the art. Examples of these are described in Hans Zweifel, Plastics Additives Handbook, 5th edition 2001, Carl Hanser Verlag. Suitable fillers are known to those skilled in the art. Examples of these are described in Katz, Harry S.; Milewski, John V. [Ed.], Handbook of Fillers for Plastics, 1987, Kluwer Academic Publishers Group.

The present invention further relates to a method for producing the inventive porous metal-organic framework material comprising the steps:
preparing a porous metal-organic framework material which can take up at least one substance comprising at least one at least bidentate compound bound by coordination to at least one metal ion;
contacting the metal-organic framework material with at least one monomer which is suitable for forming a polymer which can adsorb the at least one substance;
converting the at least one monomer into the polymer.

As already set forth above, the polymer can be made up of a single monomer or from different monomers. To ensure the formation of the polymer in the pores of the metal-organic framework material, the monomer or the monomers from which the polymer is made up must first be brought into contact with the metal-organic framework material. This can proceed, for example, by simple combination of monomer, or monomers, and framework material. To achieve homogeneous distribution of the monomers or of the monomer in the metal-organic framework material, the contacting preferably proceeds with stirring, kneading or by vortexing, which can be achieved, for example, using an if appropriate inert gas stream.

In this case the monomers are preferably present as pure substances. However, they can also be present diluted in a preferably inert solvent. By means of the dilution, if appropriate the fraction of the pore volume which is to be occupied by the polymer can be preset. However, it is a particular advantage in this case if the solvent is selected in such a manner that it has low adsorption to the porous metal-organic framework material in order in this manner not to impair the take up of the monomer or of the monomers by the metal-organic framework material.

Preferably, as solvent, use can be made of an initiator for the polymer reaction. The monomer or the monomers, however, can also be contacted in the gaseous state with the porous metal-organic framework material. This can take place at atmospheric pressure or in a gas atmosphere which is supersaturated with monomer. For instance, it is conceivable, for example, to expose the pulverulent metal-organic framework material in a pressure chamber to a gas atmosphere supersaturated with monomers in such a manner that the metal-organic framework material is agitated, for example is vortexed, in this gas atmosphere, or by the metal-organic framework material being introduced from the top into the pressure chamber, falling through the gas space, taking up the monomer or the monomers and subsequently being removed from the pressure chamber.

The framework materials can also be contacted first with the gaseous monomers or the gaseous monomer in a pressure chamber, subsequently a pressure elevation or a temperature reduction proceeding, so that the monomer condenses, or the monomers condense, and thus contacting with the metal-organic framework material being ensured. For instance, for example a pressure jump can proceed by the volume of the pressure chamber being compressed or by further gaseous monomer or monomers being forced into the pressure chamber or by an inert foreign gas being forced into the pressure chamber. A further possibility is to contact the monomer or the monomers in liquid form or in solution with the metal-organic framework material and subsequently, by lowering the ambient pressure, to remove non-adsorbing monomers and if appropriate the solvent, from the metal-organic framework material. By the use of solvents, monomers solid at room temperature can also be contacted with the metal-organic framework material in a suitable manner.

Finally, the monomers or the monomer can be contacted with the metal-organic framework material in solid form, for example powdered, by simple mixing, and can then be melted, which preferably proceeds by mixing for example by stirring, kneading, extrusion or vortexing.

The take up of the monomer, or monomers, can proceed batchwise or continuously.

Since energy is released on take up of the monomers by the metal-organic framework material, the fraction of the pore volume which is later occupied by the polymer can be controlled via the temperature. A low temperature can be advantageous in order to effect take up of the monomers in the pores of the metal-organic framework material rapidly and in a high amount. However, a higher temperature can also be advantageous if, for example, it is intended to initiate the polymerization immediately after take up of the monomers on account of the higher temperature.

To enable conversion of the at least one monomer into the polymer, it is first required to start the polymerization. In this case initiation of the polymerization must be matched to the monomers to be used. The initiation step is preferably selected in such a manner that no further substances are required for this. Such an initiation can proceed, if appropriate, by thermal effect or by radiation.

The monomers can be polymerized, for example, by free-radical means or ionically or by polycondensation or polyaddition.

In particular, preference is given to thermally polymerizable monomers, very particularly preferably, the formation of the polymer is enabled by thermal self-polymerization. Of the group of the monomers described in more detail above, for thermal self-polymerization, in particular styrene, divinylbenzene and methyl methacrylate are suitable.

If a volatile compound is formed in the polymerization, it is preferably removed from the inventive porous metal-organic framework material by pressure reduction. This can increase the throughput. This procedure is advantageous, in particular in polycondensations.

The inventive porous metal-organic framework material present after conversion of the at least one monomer into the polymer can be present in pulverulent form or in crystalline form. The inventive framework material can be used as such or it is converted into a shaped body. Preferred methods in this case are strand extrusion or tableting. In the shaped body production, the inventive framework material can have further materials, for example binders, lubricants or other additives, which are added during the production. It is likewise conceivable that the inventive framework material has further constituents, such as, for example, adsorbents such as activated carbon or the like.

With respect to the possible geometries of the inventive porous metal-organic framework material, essentially no limitations exist. For example, pellets, inter alia, such as, for example, disk-shaped pellets, pills, beads, granules, extrudates, for example strands, honeycombs, meshes or hollow bodies are to be mentioned.

For the production of these shaped bodies, in principle all suitable methods are possible. In particular, the following procedures are preferred:

Kneading the framework material alone or together with at least one binder and/or at least one pasting agent and/or at least one template compound to obtain a mixture; forming the resultant mixture by means of at least one suitable method, such as, for example, extrusion; optionally washing and/or drying and/or calcining the extrudate; optionally final processing.

Applying the framework material to at least one if appropriate porous support material. The resultant material can then be further processed in accordance with the above-described method to give a shaped body.

Applying the framework material to at least one if appropriate porous substrate.

Kneading and forming can proceed according to any suitable method, such as, for example, as described in Ullmanns Enzyklopädie der Technischen Chemie [Ullmann's Encyclopedia of Industrial Chemistry], 4th edition, volume 2, pp 313 ff. (1972).

For example, the kneading and/or forming can proceed by means of a piston press, roller press in the presence or absence of at least one binder material, compounding, pelleting, tableting, extrusion, co-extrusion, foaming, spinning, coating, granulation, preferably spray-granulation, spraying, spray-drying or a combination of two or more of these methods.

Very particularly, pellets and/or tablets are produced.

The kneading and/or forming can proceed at elevated temperature, such as, for example, in the range from room temperature to 300° C. and/or at elevated pressure, such as, for example, in the range from atmospheric pressure up to some hundred bar and/or in a protective gas atmosphere such as, for example, in the presence of at least one noble gas, nitrogen, or a mixture of two or more thereof.

The kneading and/or forming is carried out according to a further embodiment with addition of at least one binder, as binder, in principle any chemical compound being able to be used which ensures the viscosity desired for kneading and/or forming of the compound to be kneaded and/or formed. Accordingly, binders in the context of the present invention can be not only viscosity-increasing, but also viscosity-lowering compounds.

Binders to be mentioned as, inter alia, preferred, are, for example, aluminum oxide or aluminum oxide-comprising binders, as are described, for example, in WO 94/29408, silicon dioxide, as described, for example, in EP 0 592 050 A1, mixtures of silicon dioxide and aluminum oxide, as are described, for example, in WO 94/13584, clay minerals, as are described, for example, in JP 03-037156 A, for example montmorillonite, kaolin, bentonite, halloysite, dickite, nacrite and anauxite, alkoxysilanes, as are described, for example, in EP 0 102 544 B1, for example tetraalkoxysilanes, such as, for example, tetramethoxysilane, tetraethoxysilane, tetrapropoxysilane, tetrabutoxysilane, or, for example, trialkoxysilanes, such as, for example, trimethoxysilane, triethoxysilane, tripropoxysilane, tributoxysilane, alkoxytitanates, for example tetraalkoxytitanates, such as, for example, tetramethoxytitanate, tetraethoxytitanate, tetrapropoxytitanate, tetrabutoxytitanate, or, for example, trialkoxytitanates, such as, for example, trimethoxytitanate, triethoxytitanate, tripropoxytitanate, tributoxytitanate, alkoxyzirconates, for example tetraalkoxyzirconates, such as, for example, tetramethoxyzirconate, tetraethoxyzirconate, tetrapropoxyzirconate, tetrabutoxyzirconate, or, for example, trialkoxyzirconates, such as, for example, trimethoxyzirconate, triethoxyzirconate, tripropoxyzirconate, tributoxyzirconate, silicasols, amphiphilic substances and/or graphites. In particular preference is given to graphite.

As viscosity-increasing compound, use can also be made of, for example, if appropriate in addition to the abovementioned compounds, an organic compound and/or a hydrophilic polymer, such as, for example, cellulose or a cellulose derivative, such as, for example, methylcellulose and/or a polyacrylate and/or a polymethacrylate and/or a polyvinyl alcohol and/or a polyvinylpyrrolidone and/or a polyisobutene and/or a polytetrahydrofuran.

As pasting agent, use can preferably be made of, inter alia, water or at least one alcohol, such as, for example, a monoalcohol having 1 to 4 carbon atoms, such as, for example, methanol, ethanol, n-propanol, isopropanol, 1-butanol, 2-butanol, 2-methyl-1-propanol or 2-methyl-2-propanol or a mixture of water and at least one of said alcohols or a polyhydric alcohol such as, for example, a glycol, preferably a water-miscible polyhydric alcohol, alone or as a mixture with water and/or at least one of said monohydric alcohols.

Further additives which can be used for the kneading and/or forming are, inter alia, amines or amine derivatives such as, for example, tetraalkylammonium compounds or amino alcohols and carbonate-comprising compounds such as, for example, calcium carbonate. Such further additives are described, for instance, in EP 0 389 041 A1, EP 0 200 260 A1 or WO 95/19222.

The sequence of additives such as template compound, binder, pasting agent, viscosity-increasing substance during forming and kneading is not fundamentally critical.

According to a further preferred embodiment, the shaped body obtained from kneading and/or forming is subjected to at least one drying which is generally carried out at a temperature in the range from 25 to 300° C., preferably in the range from 50 to 300° C., and particularly preferably in the range from 100 to 300° C. It is likewise possible to dry in vacuum or under a protective gas atmosphere or by spray drying.

According to a particularly preferred embodiment, in the context of this drying operation, at least one of the compounds added as additive is at least in part removed from the shaped body.

The present invention further relates to a method for taking up at least one substance comprising the step contacting the at least one substance with a framework material according to the present invention.

As already set forth above, the at least one substance can be a gas or a liquid. Preferably it is a gas, in particular hydrogen.

The present invention further relates to the use of an inventive framework material for taking up at least one substance for its storage, separation, controlled release or chemical reaction.

If the substance serves for storage, it is suitably contacted in pure form with the inventive framework material, so that it can be taken up by the metal-organic framework material and also the polymer.

If the at least one substance is taken up for separation, the substance to be taken up, before take up, is present in a composition of matter. This composition of matter is likewise preferably a gas. Those which are to be mentioned here are, for example: natural gas, biogas, exhaust gases, air, exhaust air or inert gas.

If the take up of the at least one substance serves for controlled release, the substance is preferably a fragrance, as has already been described further above, or it is an active substance or substance which is to be released in a retarded manner.

Likewise, the storage of the at least one substance can serve for later controlled release. In this case, customarily, a system is used in which the storage, in particular of the gas component, proceeds by pressure increase. In this case, the system can be a pressure vessel which comprises, for example, the inventive framework material. In this case the controlled release can proceed via valve apparatuses.

The take up of the at least one substance can further serve for the chemical reaction of this substance. In this case, in particular chemical reactions are to be considered which can proceed under heterogeneous catalysis. Examples of such reactions are hydrogenation by means of hydrogen, for example the hydrogen first being taken up in the inventive framework material. A further example of such a reaction is alkoxylation, as described, for example, in WO-A 03/035717.

The invention will be described in more detail with reference to the examples hereinafter.

EXAMPLES

Example 1

Free-Radical Self-Polymerization

A solution of 23.75 g of styrene and 1.25 g of divinylbenzene is mixed intimately at room temperature and at atmospheric pressure with 100 g of pulverulent MOF-5.

The mixture is subsequently charged at atmospheric pressure into a stainless steel bomb (volume=100 ml), the stainless steel bomb is sealed and heated at 140° C. in an oil bath for 10 hours to obtain the inventive framework material.

Example 2

Polycondensation with Two Monomers

A mixture of 2.11 g of dimethyl malonate and 2.18 g of xylylenediamine is mixed intimately with 20 g of MOF (Zn-MOF-5) at room temperature and atmospheric pressure.

The mixture is subsequently stored under inert gas (nitrogen) for 2 hours at 250° C. The starting pressure is 10 bar, in the course of heating the pressure rises. At a pressure of 18 bar, by careful expansion, a pressure of 16 bar is established. After the expiry of 2 hours, the sample is cooled overnight.

Example 3

Polycondensation with Two Monomers

A mixture of 5.77 g of dimethyl malonate and 2.99 g of ethylene glycol is mixed intimately with 50 g of MOF (Zn-MOF-5) at room temperature and at atmospheric pressure.

The mixture is first stored at 200° C. at ambient pressure under inert gas (nitrogen) for 70 minutes, subsequently the pressure is reduced to 1 mbar for a further 140 minutes.

Example 4

Polycondensation with Initiator and a Monomer

A mixture of 15 g of caprolactam and 50 g of MOF (Zn-MOF-5) is mixed intimately at a temperature of 90° C. The mixture is cooled and mixed intimately with a few drops of water.

The resultant mixture is stored at 270° C. for 2 hours under inert gas (nitrogen). The starting pressure of the inert gas is 16 bar, in the course of heating the pressure increases. At a pressure of 20 bar, by careful expansion, a pressure of 19 bar is established.

Subsequently, in the course of 1.5 h the pressure is reduced to atmospheric pressure and the sample treated with nitrogen gas for a further hour. The sample is cooled overnight.

Example 5

$H_2$ Isotherms at 77 and 87 K

For the metal-organic framework material which was produced in Example 3 and, in its pores, comprises at least in part a polyester, the $H_2$ isotherms were determined at 77 K and 87 K and compared with those of the pure metal-organic framework material (Zn-MOF-5).

Figure 1B:
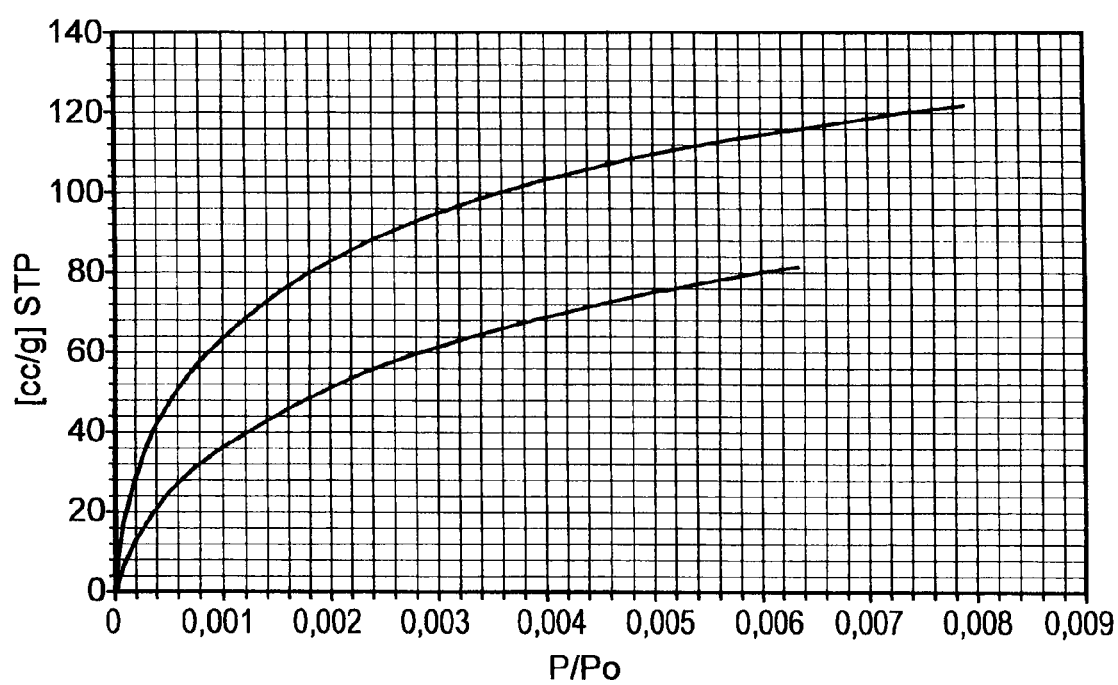
FIG. 1b shows the $H_2$ isotherms of the inventive framework material.

FIG. 1a shows the $H_2$ isotherms of the framework material Zn-MOF 5 (MOF 5) known from the prior art and FIG. 1b for the inventive framework material. The upper curve in each case corresponds to the determination at 77 K. The lower curve in each case was measured at 87 K.

Figure 2:
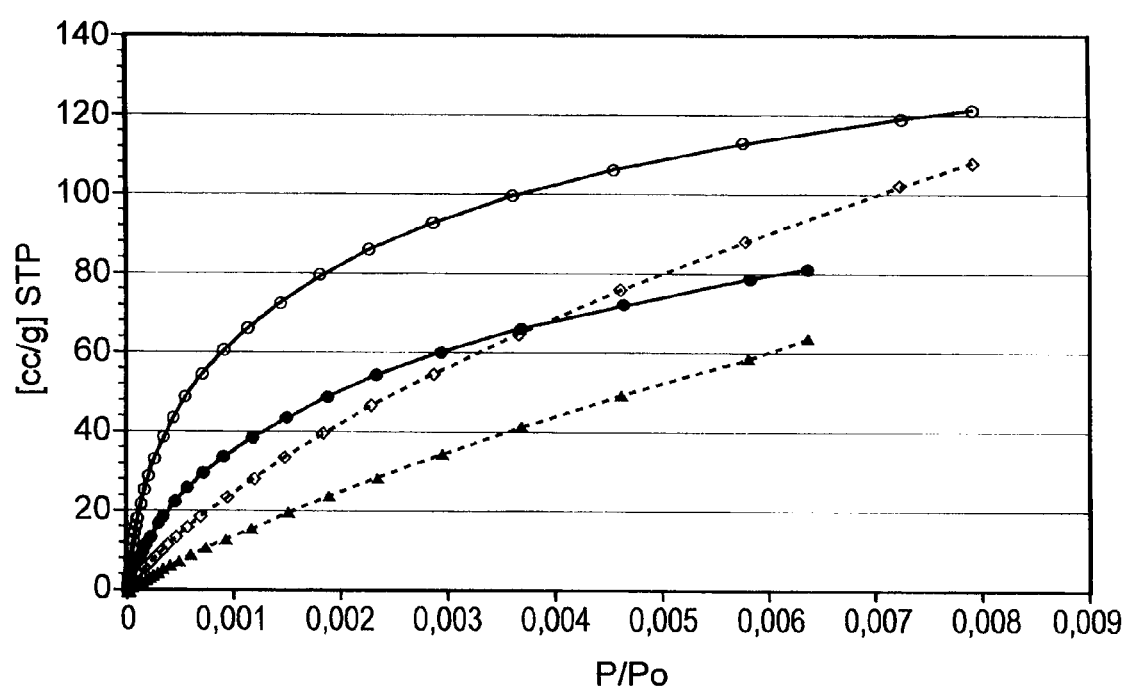
FIG. 2 shows the curves from FIGS. 1a and 1b once more compiled.

In FIG. 2 the curves from FIGS. 1a and 1b are once more compiled. In the figure the meanings are as follows:

- ──○── at 77K MOF-5+polyester
- ──●── at 87K MOF-5+polyester
- ──◇── at 77K MOF-5
- ──▲── at 87K MOF-5

After calculation via a Clausius-Clapeyron approach, the following heat absorption result for hydrogen from the isotherms at 77 K and 87 K:

Zn-MOF5: 3.6 kJ/mol polyester-modified: 6.6 kJ/mol

These results show a markedly increased binding of the $H_2$ to the polyester-modified metal-organic framework material. It is thus possible to store hydrogen at a higher temperature compared with the prior art. This also shows the comparison with the heat of evaporation reported in the literature of liquid hydrogen (0.9 kJ/mol).

Example 6

Free-Radical Self-Polymerization

A solution of X g of styrene and Y g of methyl methacrylate are intimately mixed at room temperature and under atmospheric pressure with 20 g of pulverulent Zn MOF-5.

The mixture is subsequently polymerized in an autoclave under nitrogen (13 bar) at a temperature of 125° C. in the course of 4 hours.

Figure 3:
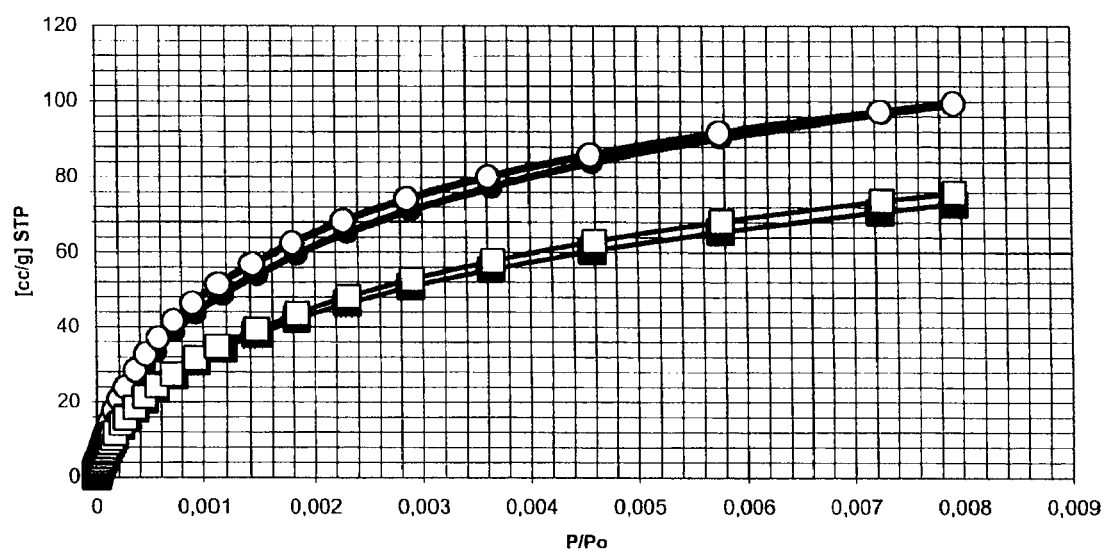
FIG. 3 shows the $H_2$ isotherms of experiments 6a-d each measured at 77 K.
Figure 4:
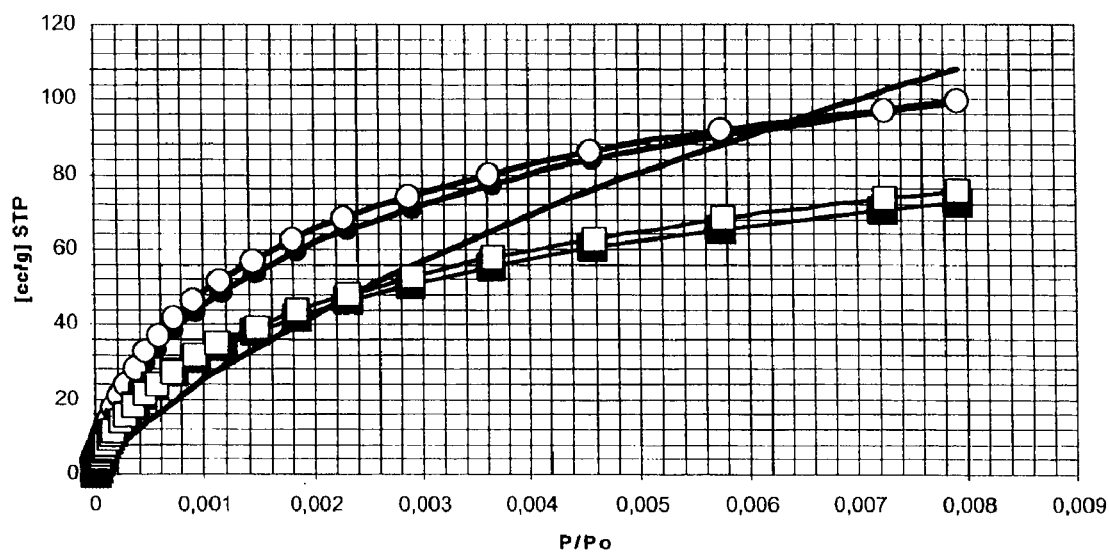
FIG. 4 shows the curves from FIGS. 3 and 1a combined.

| Experiment | X | Y | Representation in FIGS. 3 and 4 |
|---|---|---|---|
| 6a | 3.75 | 3.75 | ──●── |
| 6b | 7.50 | 7.50 | ──■── |
| 6c | 1.88 | 5.62 | ──○── |
| 6d | 3.75 | 11.25 | ──□── |

FIG. 3 shows the $H_2$ isotherms of experiments 6a-d each measured at 77 K.

In FIG. 4, curves from FIG. 3 and FIG. 1a are combined once again, here the Zn-MOF5 measured at 77 K is shown as a continuous black line.

Results show a significantly higher water absorption of the polymer-modified metal-organic framework materials in the range of low pressures. This applies particularly to the experiments 6a and 6c (circular symbols), that is to say to the lower amounts of monomer.

Example 7

Mixing Metal-Organic Framework Material and Polystyrene

A solution of 10 g of polystyrene (MVR=9.5 ml/10 min, measured at 200° C./5 kg) in 40 g of dichloromethane is intimately mixed with 50 g of pulverulent Zn MOF-5 in a nitrogen atmosphere at room temperature and atmospheric pressure.

The mixture is subsequently kept for 48 h in the nitrogen atmosphere, so that solvent residues can evaporate off.

Figure 5:
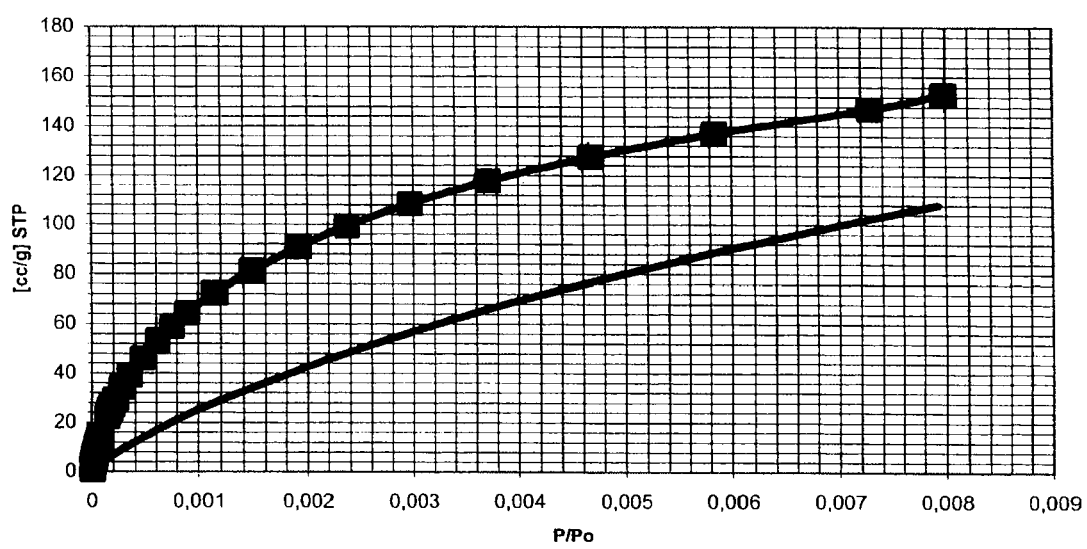
FIG. 5 plots a $H_2$ isotherms of a mixture, measured at 77 K.

In FIG. 5, the $H_2$ isotherms measured at 77 K of the mixture are plotted ( ──■── ); the Zn-MOF5 is shown as a continuous black line.

The results show a significantly higher water absorption of the polymer-modified metal-organic framework materials.

Example 8

Mixing MOF and Polystyrene

A solution of X g of styrene is intimately mixed with 5 g of pulverulent Zn MOF-5 in a nitrogen atmosphere at room temperature and at atmospheric pressure.

The mixture is subsequently charged into an autoclave (volume=100 ml) under inert gas, nitrogen is forced into 10 bar, and the closed autoclave is heated for 10 hours at 125° C. in order to obtain the framework material according to the invention.

Figure 6:
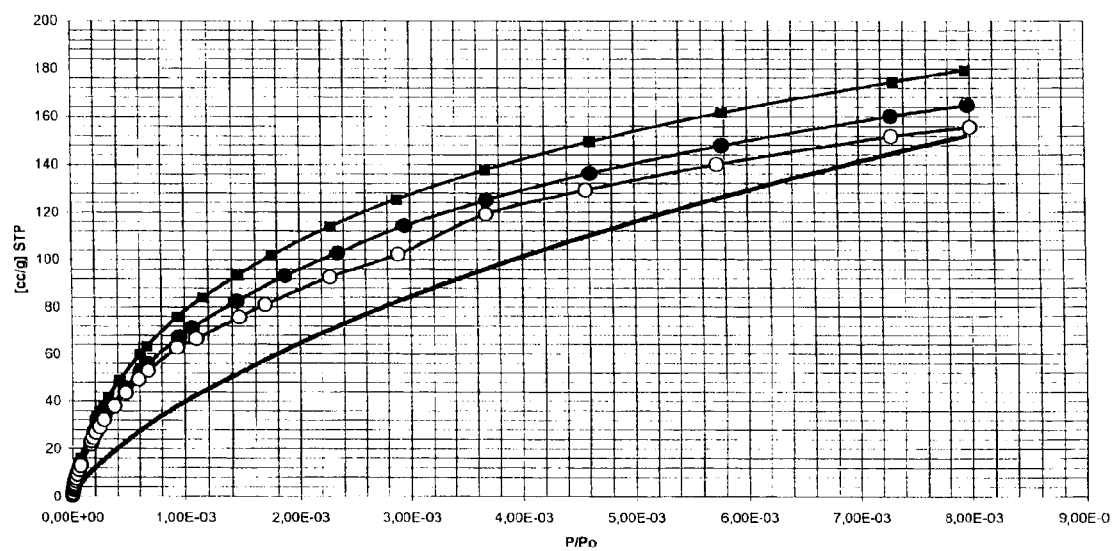
FIG. 6 plots a $H_2$ isotherms of a mixture, measured at 77 K.

In FIG. 6, the $H_2$ isotherms measured at 77 K of the mixture are plotted; the reference framework material is shown as a continuous black line.

| Experiment | X | Representation in FIG. 6 |
|---|---|---|
| 8a | 0.50 | ──●── |
| 8b | 0.75 | ──■── |
| 8c | 1.00 | ──○── |

The results show a significantly higher water absorption of the polymer-modified metal-organic framework materials.

What is claimed is:

1. A porous metal-organic framework material for taking up at least one substance, the framework material comprising at least one at least bidentate organic compound bound by coordination to at least one metal ion, and the framework material having pores at least in part which comprise a polymer which is suitable for absorbing the at least one substance.

2. The framework material according to claim 1, wherein the framework material comprises Mg, Ca, Fe, Zn, Al, Ni or Cu as metal ion and the at least bidentate organic compound is selected from the group consisting of terephthalic acid, isophthalic acid, 2,6-naphthalenedicarboxylic acid and 1,3,5-benzenetricarboxylic acid.

3. The framework material according to claim 1, wherein at least 5% by weight and at most 95% by weight of the maximum possible amount taken up in the framework material of the polymer-forming monomer(s) are used.

4. The framework material according to claim 1, wherein the at least one substance is a gas.

5. The framework material according to claim 1, wherein the polymer is selected from the group consisting of an aromatic polymer, a polyamide, a polyester, a polyether, a polyacetal, a polycarbonate, a polyacrylate and mixtures thereof.

6. The framework material according to claim 5, wherein the polymer is a styrene-based polymer.

7. A method for producing a framework material according to claim 1 comprising preparing a porous metal-organic framework material which can take up at least one substance comprising at least one at least bidentate compound bound by coordination to at least one metal ion;

contacting the metal-organic framework material with at least one monomer which is suitable for forming a polymer which can adsorb the at least one substance; and converting the at least one monomer into said polymer.

8. A method for taking up at least one substance comprising contacting the at least one substance with a framework material according to claim 1.

9. The method according to claim 8, wherein the at least one substance is a gas selected from the group consisting of hydrogen, natural gas, town gas, methane, propane and butane.

10. A method of using a framework material according to claim 1 for taking up at least one substance for its storage, separation, controlled release or chemical reaction.

* * * * *